United States Patent [19]
Fergason

[11] Patent Number: 5,606,458
[45] Date of Patent: Feb. 25, 1997

[54] HEAD MOUNTED DISPLAY AND VIEWING SYSTEM USING A REMOTE RETRO-REFLECTOR AND METHOD OF DISPLAYING AND VIEWING AN IMAGE

[76] Inventor: James L. Fergason, 92 Adam Way, Atherton, Calif. 94025

[21] Appl. No.: 383,466

[22] Filed: Feb. 3, 1995

Related U.S. Application Data

[63] Continuation-in-part of Ser. No. 295,383, Aug. 24, 1994.

[51] Int. Cl.$^6$ .................................................. G03B 21/28
[52] U.S. Cl. ........................................ 359/630; 359/633
[58] Field of Search .................................. 359/630, 631, 359/632, 633, 634, 636; 345/7, 9, 629

[56] References Cited

U.S. PATENT DOCUMENTS

| | | | |
|---|---|---|---|
| Re. 32,521 | 10/1987 | Fergason | 350/334 |
| 2,482,115 | 9/1949 | Laird, Jr. | 88/24 |
| 2,581,000 | 1/1952 | Copeland . | |
| 2,698,553 | 1/1955 | Copeland . | |
| 2,782,681 | 2/1957 | Copeland . | |
| 2,883,908 | 4/1959 | Copeland . | |
| 3,200,702 | 8/1965 | Giordano | 359/630 |
| 3,447,854 | 6/1969 | Minter | 359/471 |
| 3,609,007 | 9/1971 | Peek | 350/150 |
| 3,620,592 | 11/1971 | Freeman | 359/639 |
| 3,657,981 | 4/1972 | Benton | 95/18 P |
| 3,767,291 | 10/1973 | Johnson | 359/237 |
| 3,767,305 | 10/1973 | Craven | 356/71 |
| 3,772,507 | 11/1973 | Hills | 352/125 |
| 3,832,038 | 8/1974 | Johnson | 350/236 |
| 4,097,128 | 6/1978 | Matsumoto et al. | 350/335 |
| 4,114,990 | 9/1978 | Mash et al. | 350/337 |
| 4,153,913 | 5/1979 | Swift | 348/115 |
| 4,200,366 | 4/1980 | Freeman | 353/78 |
| 4,205,224 | 5/1980 | Mecklenborg | 250/201 |
| 4,207,467 | 6/1980 | Doyle | 250/338.1 |
| 4,347,507 | 8/1982 | Spooner | 340/705 |
| 4,347,508 | 8/1982 | Spooner | 340/705 |
| 4,348,185 | 9/1982 | Breglia | 434/43 |
| 4,385,806 | 5/1983 | Fergason | 350/347 |
| 4,509,837 | 4/1985 | Kassies | 353/10 |
| 4,540,243 | 9/1985 | Fergason | 350/347 |
| 4,548,470 | 10/1985 | Erland | 350/129 |
| 4,561,722 | 12/1985 | Smetana | 350/171 |
| 4,609,253 | 9/1986 | Perisic | 350/174 |
| 4,647,967 | 3/1987 | Kirschner et al. | 358/109 |
| 4,648,691 | 3/1987 | Oguchi et al. | 350/338 |
| 4,840,455 | 6/1989 | Kempf | 350/137 |
| 4,987,410 | 1/1991 | Berman et al. | 340/705 |
| 4,994,794 | 2/1991 | Price et al. | 340/705 |
| 4,997,263 | 3/1991 | Cohen et al. | 350/345 |
| 5,015,096 | 5/1991 | Kowalski et al. | 356/371 |
| 5,189,452 | 2/1993 | Hodson | 353/94 |
| 5,293,271 | 3/1994 | Merritt et al. | 359/858 |
| 5,337,096 | 8/1994 | Qu et al. | 353/7 |
| 5,388,276 | 2/1995 | Holmes | 2/421 |
| 5,418,584 | 5/1995 | Larson | 353/122 |
| 5,499,138 | 3/1996 | Iba | 359/569 |

FOREIGN PATENT DOCUMENTS

| | | |
|---|---|---|
| 56-114931 | 9/1981 | Japan . |
| 62-47623 | 3/1987 | Japan . |
| 63-13018 | 1/1988 | Japan . |
| 2033602 | 5/1980 | United Kingdom . |
| WO9218971 | 10/1992 | WIPO . |

*Primary Examiner*—Georgia Y. Epps
*Assistant Examiner*—Ricky Mack
*Attorney, Agent, or Firm*—Renner, Otto, Boisselle & Sklar, P.L.L.

[57] ABSTRACT

A head mounted display system includes focusing optics to focus light from an image source, retro-reflector and beamsplitter, the image source and beamsplitter directing light toward the retro-reflector to focus a real image, and the light reflected from the retro-reflector being directed via the beamsplitter for viewing, thereby to use conjugate optics effectively to place the viewing eye or detector in relation to the image source the same as the relation of the focusing optics to the image source. The retro-reflector may be mounted on a common housing or support with the beamsplitter and focusing optics or it may be remotely located. A method for forming an image using conjugate optics in which light from a source is focused to form a real image at a retro-reflector and is reflected for viewing.

42 Claims, 12 Drawing Sheets

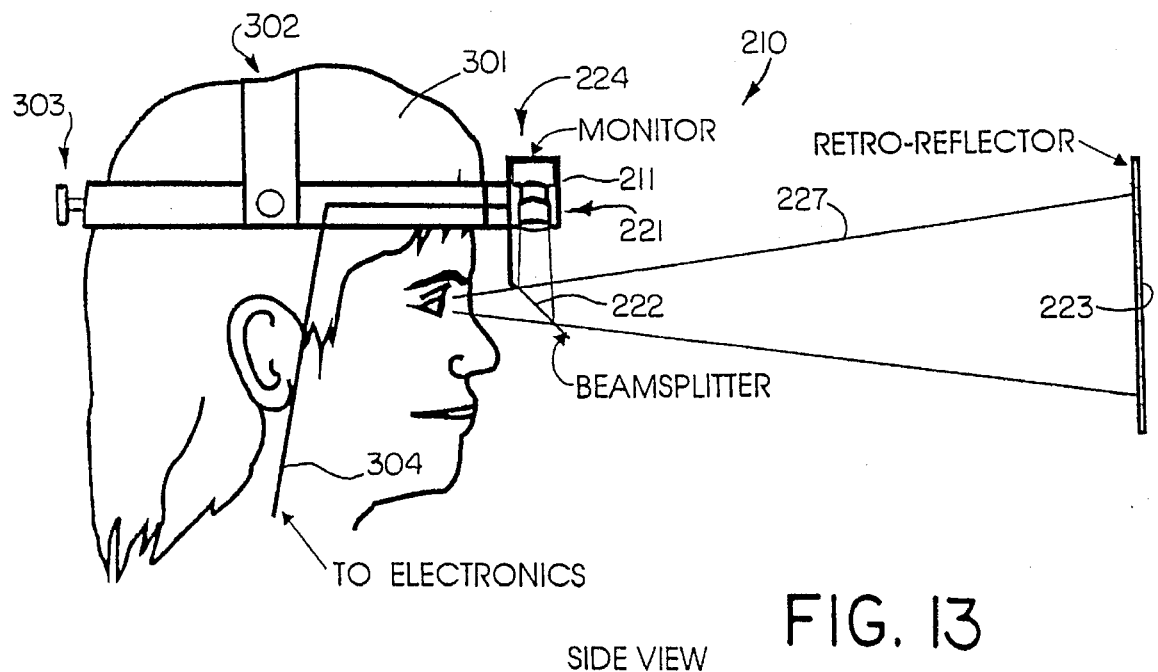
FIG. 13 SIDE VIEW
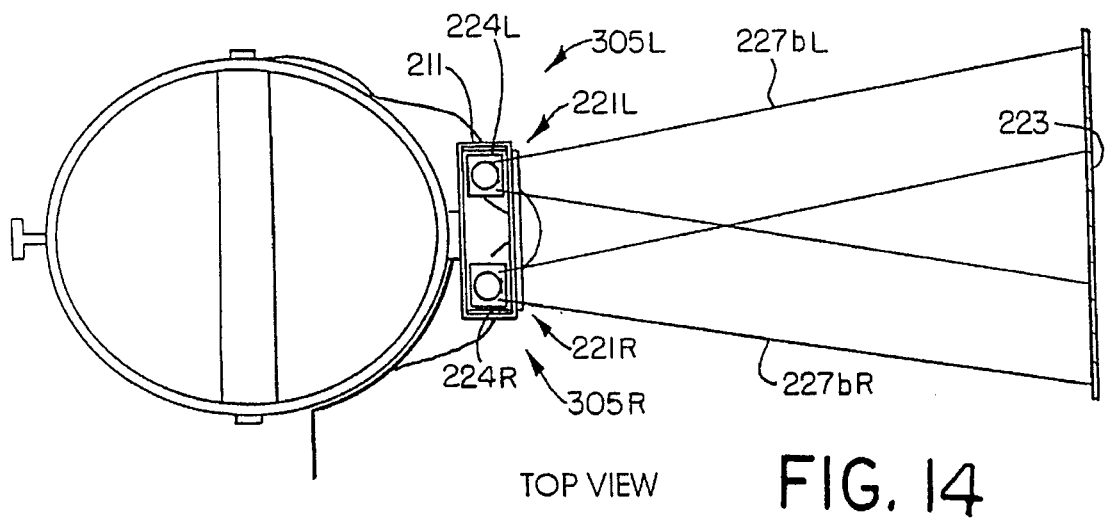
FIG. 14 TOP VIEW

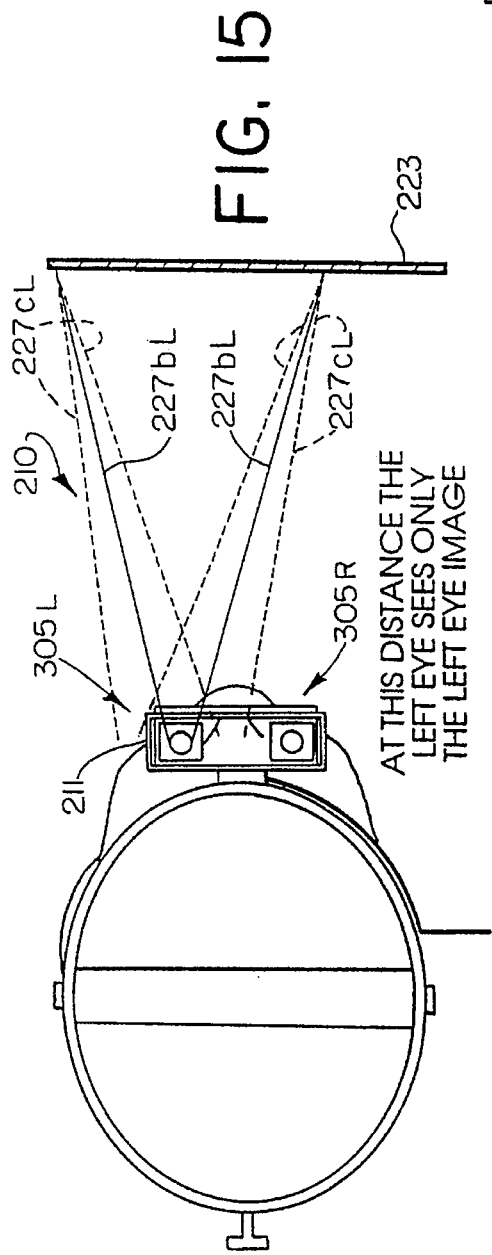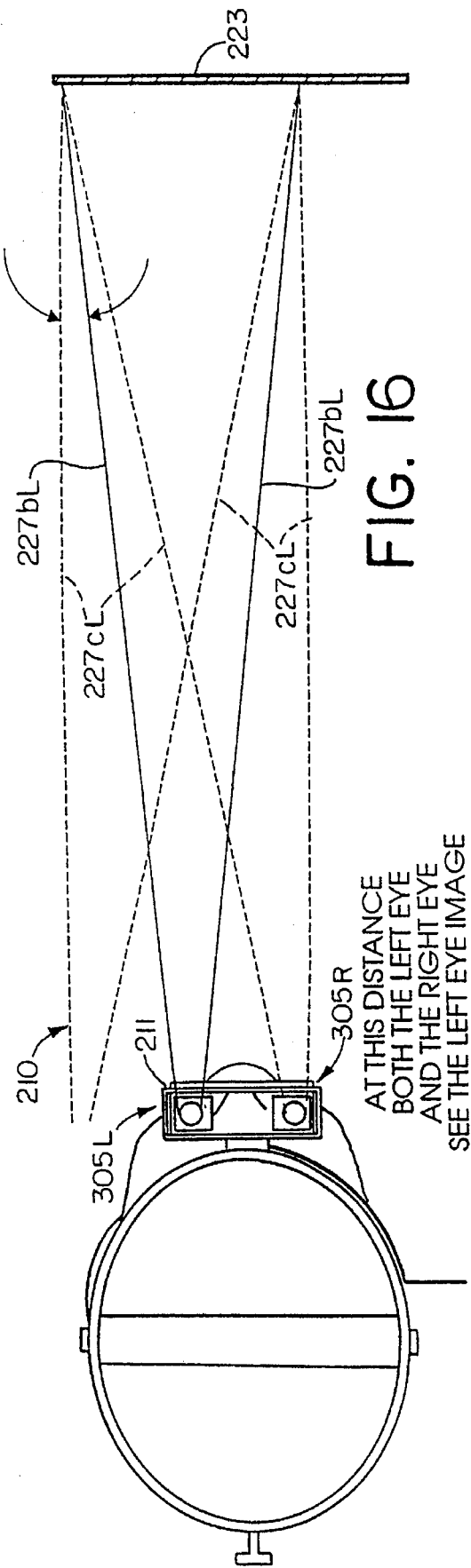

HEAD MOUNTED DISPLAY AND VIEWING SYSTEM USING A REMOTE RETRO-REFLECTOR AND METHOD OF DISPLAYING AND VIEWING AN IMAGE

This is a continuation-in-part of U.S. patent application Ser. No. 08/295,383, filed Aug. 24, 1994, entitled "Optical system for a head mounted display using a retro-reflector and method of displaying an image," the entire disclosure of which hereby is incorporated by reference.

TECHNICAL FIELD

The present invention relates generally, as is indicated, to optical displays and viewing systems, and, more particularly, to such systems in which at least part is head mounted or otherwise positioned relative to a viewer and using conjugate optics, for example, including a retro-reflector which may be relatively remote from the viewer, and to a method of displaying and viewing an image.

BACKGROUND

Various types of head mounted displays are known. An exemplary head mounted display (throughout the following specification the initials "HMD" may be used to mean "head mounted display") includes optics or optical components such as lenses, mirrors or the like, to direct the image from an image source to an eye or to the respective eyes of a person viewing the image (viewer). The image source develops and/or provides an image intended to be viewed and may or may not be pan of the HMD. Head mounted display systems are used in the field of virtual reality and also in aircraft, for example, as pan of a heads-up display system, and in other fields, too.

Many prior head mounted display systems use light emitting sources to create an image, such as a cathode ray tube, light emitting diode, etc. Several disadvantages to such light sources and head mounted displays using them are relatively large size, weight, and cumbersome nature. For example, in some virtual reality display systems, counterbalancing weights and support systems are needed to hold or to help to hold the helmet containing the virtual reality image source and optics so that it does not severely weigh down the head, neck, shoulders, etc. of the user.

In some prior display systems a modulator modulates light from a source; the images created are a function of modulation. A liquid crystal cell or liquid crystal display device may be such a modulator. A disadvantage of such modulating systems is the reduction in light output due to light blocking and/or absorption occurring in the modulator. To overcome such reduction in brightness, sometimes the intensity of the light source is increased, which draws additional energy, creates heat, requires a larger light source, etc.

Another disadvantage to prior head mounted display systems is the complexity of the components and of the arrangement of the components to provide the desired display or image output. Complexity, size, and so forth usually increase the cost for such systems and reduce the robustness of the system.

It is desirable that a display, especially a HMD, have adequate eye relief and comfort with which images provided by the HMD can be viewed. One aspect of comfort is the distance at which the image is viewed; a comfortable viewing distance is about twenty inches or more, for example, approximate reading distance. An aspect of eye relief is the distance between the eye and the last optical element (such as the output objective of the display) closest to the eye; often it is desirable that such distance be relatively large to provide adequate eye relief. If adequate eye relief is not provided and/or if the viewing distance at which the image is seen is less than about twenty inches, then the eye may be strained to view the image, which may be uncomfortable and usually is undesirable.

The definition of eye relief also is described in *Information Display*, Vol. 10, No. 7 & 8, July/August 1994, pages 12–16, the article by Robert E. Fisher entitled "Optics For Head-Mounted Displays."

It would be desirable to reduce the size, weight and complexity of a display system, especially a head mounted display system.

It would be desirable to provide a relatively uncomplicated, small and robust display system, especially for a HMD.

It also would be desirable to provide a high quality image, e.g., bright and of good contrast and, if used, color, for viewing using a HMD, and especially to derive the image using a small display device.

Further, it would be desirable to obtain a relatively wide field of view in an optical display system, especially a head mounted one, and efficiently to deliver light produced by the light source to the viewer. Efficient delivery of light reduces the brightness requirement of the light source, energy requirements and output heat, while providing good brightness, resolution and contrast of the viewed image.

Additionally, it would be desirable to provide adequate eye relief in a head mounted optical display system.

Many prior HMDs and other displays have had a limited head box, which is the size of the area or location at which the viewer's head must be placed so the eyes see a desired image. For example, if a display were mounted on the head, the eyes are at a location which is relatively fixed to the place where an image is seen, such as a screen or image source, e.g., a projector and/or projection lens, liquid crystal display, CRT display, etc. In some circumstances it would be desirable to enlarge the head box to allow increased movement and positioning of the head while still permitting viewing of the displayed image.

SUMMARY

According to one aspect of the invention, a head mounted display system includes a retro-reflector, and optical means for directing light from an image source to the retro-reflector, light reflected by the retro-reflector being provided for viewing. The image source may be included as part of the HMD.

Briefly, according to the invention, light from an image source is directed by focusing optics to a conjugate optics path along which the light is directed to the eye or eyes of a viewer for viewing of an image.

In an embodiment of the invention the conjugate optics path is provided by one retro-reflector or more than one retro-reflector which at least substantially maintains the characteristics of the light incident thereon, including the results of the focusing by the focusing optics, while reflecting the light to the eye(s) of the viewer. In an embodiment of the invention a beamsplitter directs incident light from the focusing optics into the conjugate optics path, e.g., reflecting light or transmitting light with respect to the retro-reflector and to the eye(s) for viewing.

Also, light directed to the retro-reflector from the focusing optics mentioned above is reflected such that the light continues to have essentially or substantially the same direction it had when it impinged on the retro-reflector so that optically the lens of the eye can appear to be in effect at the focusing optics and the retina of the eye can appear to be in effect at the source of the image.

A further aspect is to use a relatively simple lens system to obtain a good angle of view and comfortable eye relief in a HMD.

Yet an additional aspect is to use a retro-reflector in a HMD, to focus light from an image source at a location relative to the retro-reflector, and to direct the light at least partly along the path incident to the retro-reflector for viewing of an image by a viewer, whereby a substantial amount of light from the image source is delivered to the eye of the viewer.

Even another aspect is to reduce the illumination requirements and/or size of the image source for a HMD by using an at least partially conjugate optical system to direct an image to the eyes of a viewer for viewing.

Even an additional aspect is to reduce the illumination requirements and/or size of the image source for a HMD by using an at least partially conjugate optical system to direct an image to the eyes of a viewer for viewing while providing comfortable eye relief.

Another aspect is to direct light having image characteristics from a retro-reflector to a viewer to provide the viewer an image of good brightness and resolution, such as a television or video display, for example, that is focused at a distance that provides comfortable viewing while providing acceptable eye relief.

Another aspect is to direct light having image characteristics from a retro-reflector to a viewer to provide the viewer an image that is focused at a distance that is approximately at on the order of about twenty inches, e.g., reading distance from the eye.

Another aspect is to direct light having image characteristics from a retro-reflector to a viewer to provide the viewer an image that is focused at a distance that is relatively easily focused by the viewer's eye without focusing at infinity.

According to another aspect, a display system includes an optical means for directing an image at a retro-reflector, and a beamsplitter for reflecting and transmitting light relative to the retro-reflector, whereby the beamsplitter one of transmits light and reflects light toward the retro-reflector and the other of transmits light and reflects light from the retro-reflector for viewing so that a real image is focused at a distance while comfortable eye relief is provided.

According to another aspect, a display system includes an optical means for directing an image at a retro-reflector, and a beamsplitter for reflecting and transmitting light relative to the retro-reflector, whereby the beamsplitter one of transmits light and reflects light toward the retro-reflector and the other of transmits light and reflects light from the retro-reflector for viewing so that a real image is focused at a distance that is on the order of about twenty inches from the eye.

According to another aspect, a display system includes an optical means for directing an image at a retro-reflector, and a beamsplitter for reflecting and transmitting light relative to the retro-reflector, whereby the beamsplitter one of transmits light and reflects light toward the retro-reflector and the other of transmits light and reflects light from the retro-reflector for viewing while maintaining adequate spacing between the last optical element of the display system most proximate the eye and the eye itself to provide comfortable eye relief.

Another aspect relates to using a retro-reflector or the like to collect light from a focusing optical system and to reflect that light for viewing especially for viewing an image, and, more particularly, for viewing of the image at a viewing distance that provides adequate eye relief for the viewer.

Another aspect is to provide a compact at least partly conjugate optical system for preparing an image for viewing at a viewing port such that the real image is at least a distance from the viewer's eyes to provide comfortable viewing at a distance on the order of about twenty inches or more.

According to another aspect, a display system includes an optical means for focusing an image at or approximately at a retro-reflector or with respect to a retro-reflector, and a beamsplitter for reflecting and transmitting light relative to the retro-reflector, whereby the beamsplitter one of transmits light and reflects light toward the retro-reflector and the other of transmits light and reflects light from the retro-reflector for viewing.

According to another aspect, a display system includes means for forming an image for viewing by an eye of an observer, delivery means for delivering the image from the means for forming to the eye of the observer, and the means for forming and the delivery means being cooperative to provide the image to the eye of the observer at a size at the retina of the eye that is approximately the size of the retina.

According to another aspect, a method of display includes forming an image, and reflecting the image to the eye of an observer such that the image at the retina of the eye is approximately the size of the retina of the eye.

Another aspect is to reduce the size requirements for an image source used in a HMD.

Another aspect is to reduce the brightness requirement for an image source of an optical display, while providing a bright image for viewing.

An additional aspect is to magnify an image in a display, especially a HMD, without the need for an output objective.

According to another aspect, a display includes means for directing polarized light toward a reflector to form an image, and means for discriminating light as a function of polarization to direct light from the reflector for viewing.

According to another aspect, a display includes means for directing incident light having characteristics of an image toward a retro-reflector, means for permitting viewing of reflected light reflected by the retro-reflector as a focused image, the means for permitting viewing including means for reflecting at least some of one of the incident light and reflected light and for transmitting the other of the incident and reflected light.

According to another aspect, a method of displaying an image includes directing in a first direction incident light having image characteristics toward a retro-reflector for reflection thereby, directing in a generally parallel and opposite direction to the first direction reflected light from the retro-reflector for viewing, and directing in a direction that is not at least generally parallel to the first direction at least one of the incident light prior to being directed in the first direction and the reflected light subsequent to being directed in the generally parallel opposite direction to the first direction.

According to a further aspect, a head mounted display is relatively compact, light weight, robust and able to provide relatively bright images at a viewing distance from a viewer's eye that provides comfortable viewing and which also provides eye relief.

According to another aspect, a display apparatus includes beamsplitter means for reflecting light and transmitting light, and projection means for projecting light via said beamsplitter means to form a real image to be viewed when such light is reflected by a retro-reflector for viewing via said beamsplitter means.

According to another aspect, a display system, comprises a retro-reflector, projection means for projecting light toward said retro-reflector to form a real image, beamsplitter means for directing light from said projection means to said retro-reflector and from said retro-reflector to a viewing location for viewing, said retro-reflector being located relatively remotely to said projection means and beamsplitter means to reflect light for viewing via said beamsplitter means when intercepting light from said beamsplitter means.

According to another aspect, a method of displaying a real image, comprises directing light from a projection means via a beamsplitter toward a relatively remotely located retro-reflector to form a real image, and directing reflected light from the retro-reflector via the beamsplitter for viewing at a viewing location. One or more of these and other objects, features and advantages of the present invention are accomplished using the invention described and claimed below.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the annexed drawings:

FIG. 13 is a schematic side elevation of the heads-up/see-through display system of FIG. 12 with a portion mounted on the head of a person and a remotely located retro-reflector;

FIG. 14 is a schematic top view of the heads-up/see-through display system of FIGS. 12 and 13 with a portion mounted on the head of a person and a remotely located retro-reflector;

FIGS. 15 and 16 are schematic top views of the heads-up/see-through display system of FIGS. 12–14 showing limitations on viewing distance for three dimensional (stereoscopic) viewing; and FIG. 17 is a schematic view of the heads-up/see-through display system with automatic focusing adjustment for viewing distance control.

DESCRIPTION

Figure 1:
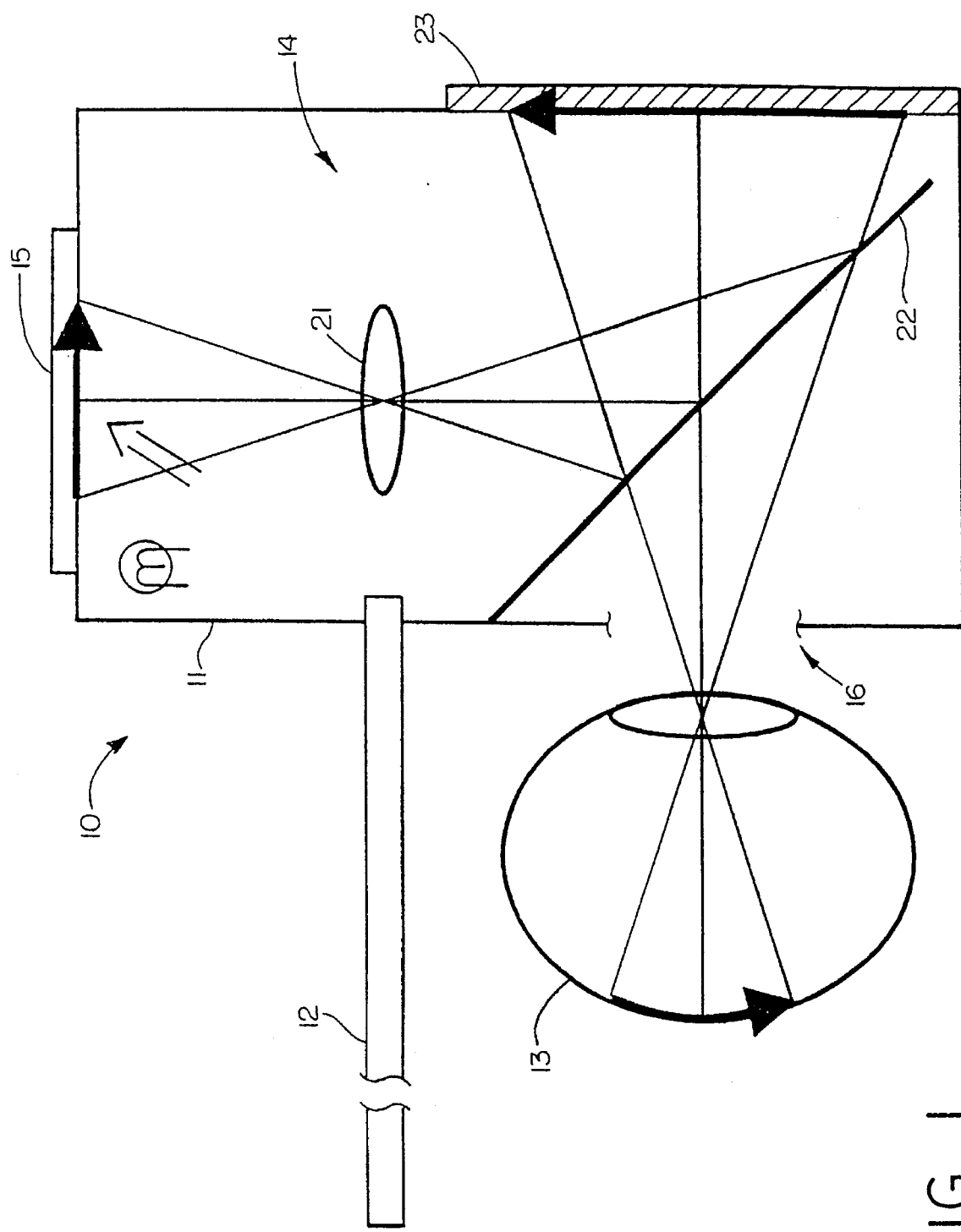
FIG. 1 is a schematic illustration of a head mounted display (HMD) optical system in accordance with the present invention shown mounted on the head of a person relative to one of the eyes.

Referring to the drawings in which like reference numerals designate like parts in the several figures, and initially to FIG. 1, a head mounted display system (referred to below as HMD) according to one example of the invention is shown at 10. The HMD 10 includes a housing 11 and a support 12. The HMD is intended to be mounted with respect to a person who can view images provided by the HMD. An exemplary eye 13 of a person is shown in FIG. 1 positioned relative to the HMD 10. The HMD may have two optical portions (only one being shown in FIG. 1 for simplicity of illustration), each being similar to that shown in the several drawings, for respectively providing images to the respective eyes of a person. The images may be coordinated to provide a three dimensional (3-D) viewing effect (sometimes referred to as stereoscopic viewing), a two dimensional (planar) viewing effect, or some other effect. Alternatively, one device, such as that shown in FIGS. 1–8, 10 and/or 11, for example, may provide images to both eyes of a person. The HMD 10 also may be used to provide images to other devices, such as cameras (still, motion, video, electronic, etc.), measuring equipment, optical evaluation equipment, copiers, scanners, etc. For illustrative purposes the HMD will be described in detail with respect to use to provide images for viewing by a person.

The HMD 10 preferably is relatively small and lightweight to facilitate positioning relative to a person, and especially to facilitate positioning relative to the head of a person to provide images to the eyes. In the embodiment illustrated in FIG. 1 the housing 11 is mounted by the support 12 to the head of a person whose eye 13 is depicted schematically. The support 12 may include a strap, cap, temple piece as in eye glasses, or other device to mount the housing 11 on the head or body of a person or relative thereto to position the housing 11 in front of the eyes. The support 12 may be part of or may be attached to another support structure mounted on a wall, floor, ceiling, or other structure of a building, vehicle, etc.

The housing 11 contains one or more of the components of the optical system 14 of the HMD 10, as will be described in greater detail below. The optical system 14 may include, as is designated at 15, for example, a light source and/or source of images to be provided by the HMD for viewing, or the housing and optical system may be coupled to another source, for example, an external source, such as a liquid crystal display, a cathode ray tube display (CRT), a television, or some other source, which supplies light and/or images. The housing 11 may completely or partially enclose the various optical components of the HMD 10. The housing has an opening or outlet as a viewing port 16 through which the eye 13 can view images provided by the HMD. Alternatively, the housing 11 may have one or more additional openings to receive light and/or a source of images, etc., for delivery ultimately to the viewing port 16. As a further alternative, the housing 11 may be one or several structural members which support but do not necessarily enclose one or more optical components of the HMD so that those members are in relative position to provide images for viewing.

Figure 2:
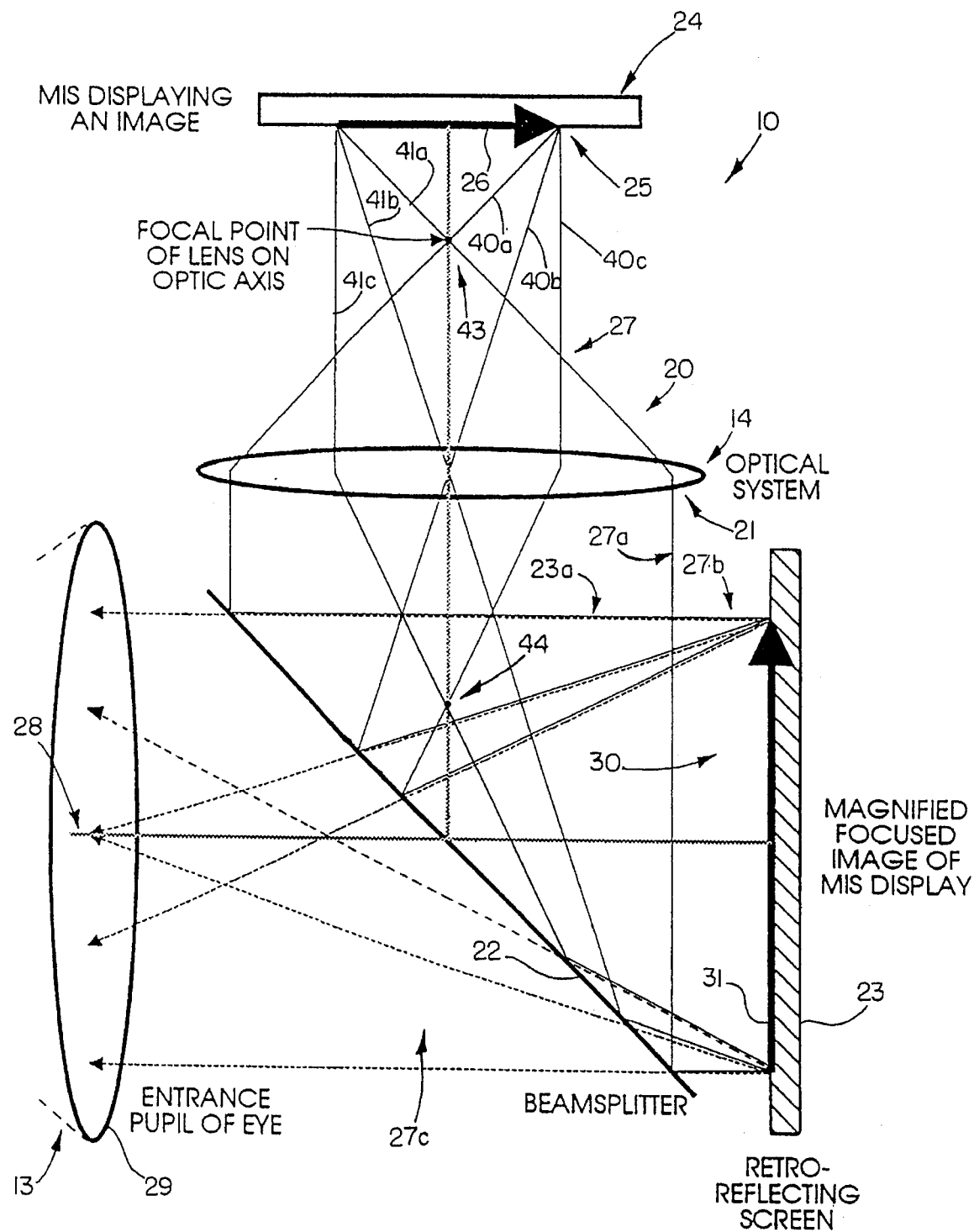
FIG. 2 is a schematic illustration of an HMD optical system utilizing a retro-reflector.

In FIG. 2 details of optical components of the optical system 14 of the HMD 10 are shown. The optical components shown in FIG. 2 are similar to those included in the housing 11 of FIG. 1; however, in FIG. 2 the housing 11 and support 12 are not shown to facilitate illustrating the invention and to simplify the drawing.

The optical components 20 of the optical system 14 of the HMD 10 include focusing optics 21 (sometimes referred to simply as "lens" or as projection optics or as a projector), a beamsplitter 22 and retro-reflector 23. The HMD also may include an image source 24 (also designated 15 above) which provides images or light having characteristics of an image and, if desired, may be part of the mentioned projector. An exemplary image source is a liquid crystal display, such as a small liquid crystal television having a cross-sectional display area on the order of about one square inch or less. Alternatively, the image source may be separate and simply used to provide one or more images or light having image characteristics that can be provided by the HMD to the eye 13. Additional optical components of the optical system 14 may include linear polarizers, circular polarizers, waveplates, focusing elements, such as lenses or mirrors, prisms, filters, shutters, apertures, diaphragms, and/or other components that may be used to provide a particular type of output image for viewing by the eye 13. Examples of several embodiments using such additional optical components are described below with respect to other drawing figures.

The invention is useful with virtually any type of image source or display source. An example of such a display source is a compact flat panel display, and especially one utilizing a reflective liquid crystal display made from a single crystal silicon active matrix array. An example of such image source is disclosed in copending, commonly owned U.S. patent application Ser. No. 08/275,907, filed Jul. 5, 1994, the entire disclosure of which hereby is incorporated by reference.

In FIG. 2 the image source 24 displays an image 25, which is shown in the drawing as an arrow 26. The light 27 leaving the image source 24 represents an image or has characteristics of an image, and that light is collected by the focusing optics 21 of the optical system 14 of the HMD 10 and travels to the beamsplitter 22. In FIG. 2 and in a number of the other drawing figures hereof the focusing optics 21 is represented as a single lens. However, it will be appreciated that the focusing optics 21 may include one or more other components, such as lenses, reflectors, filters, polarizers, waveplates, etc.

Although the image source(s) 24 is shown in the drawings located relatively above the beamsplitter 22, the image source may alternatively be located below the beamsplitter.

At least some of the light 27a incident on the beamsplitter 22 is reflected by the beamsplitter as light 27b toward the retro-reflector 23. The retro-reflector may be, for example, a screen made of retro-reflecting material. Exemplary retro-reflectors are well known. One example is that known as a corner reflector or a sheet having a plurality of corner reflectors. Another example is a material having plural glass beads or other refracting and/or reflecting devices on or in a support. An example of a retro-reflector is a film or sheet material having a plurality of corner cubes which material is sold by Reflexite Corporation of New Britain, Conn. Such material is available having about forty-seven thousand corner reflectors per square inch.

The light (light rays) 27c, which are shown as broken lines, are reflected by the retro-reflector 23 such that their path is exactly back along their direction of incidence on the retro-reflector. In this way the light rays 27c pass through the beamsplitter 22 and are focused, i.e., so as to present a real image in focus as is seen by the light ray diagram of FIG. 2, at a point or location in space, which is generally designated 28 in the illustration of FIG. 2. The eye 13 of a viewer (person) can be placed approximately at location 28 to see the image, and the pupil and lens, individually and collectively designated 29, of the eye, accordingly, are shown at that point. The lens 29 focuses the light incident thereon as an image on the retina of the eye 13.

In FIG. 2 the broken lines represent light rays which travel after reflection by the retro-reflector along the same or substantially the same path, but in the opposite direction to, respective incident light rays impinging on the retro-reflector. Thus, the retro-reflector 23 is part of a conjugate optics path 23a in which light incident thereon is reflected in the same path and opposite direction as reflected light. The beamsplitter 22 directs light from the focusing optics 21 into that conjugate optics path and toward the retro-reflector; and the beamsplitter also passes light in the conjugate optics path from the retro-reflector to the output port 16 (FIG. 1) for viewing by the eye 13. The beamsplitter 22 and retro-reflector 23 cooperate as a conjugate optics system to provide that conjugate optics path.

Using the described conjugate optics path and system, relatively minimal amount of the light from the image source 24 and focusing optics 21 is lost and, conversely, relatively maximum amount of light is directed to the eye 13. Also, there is substantial accuracy of image and image resolution conveyed to the eye. Furthermore, especially if a relatively good quality retro-reflector is used so that the precise location at which the image 30 is in focus will not be critical, e.g., it can be behind or in front of the retro-reflector, the tolerance required for the relative positioning of the components of the optical system 14 is less severe. This makes the HMD 10 relatively robust and reliable.

In FIG. 2 the viewed image 30 is represented by an enlarged arrow 31. Such arrow 31 is shown in FIG. 2 as a magnified focused image of the image 25 from the image source 24. The image 30 may be in focus at or approximately at the retro-reflector 23, and this is especially desirable for good quality images to be provided the eye 13 when a relatively low quality retro-reflector is used. A low quality retro-reflector is one which has relatively low resolution or accuracy of reflecting light in a conjugate manner in the same path but opposite direction relative to the incident light. With a low or poor quality retro-reflector and the image not being focused at the retro-reflector, it is possible that too much light may be lost from the desired conjugate optics path back to the eye 13, and this can reduce the quality of the image seen. However, the image 30 may be in focus at another location or plane either behind the retro-reflector (relative to the eye) or in front of the retro-reflector, and this is easier to do while maintaining a good quality image for viewing when the retro-reflector is a good quality one. The better the retro-reflector, the more self-conjugating is the optical system 14 and the less the need to focus with precision at the retro-reflector.

Retro-reflector quality may be indicated by the radians of beam spread of light reflected. For example, a relatively good quality retro-reflector may have from zero or about zero radians of beam spread to a few milliradians of beam spread. The quality usually is considered as decreasing in proportion to increasing beam spread of reflected light.

In considering the brightness of the image seen by the viewer, the nature of the beamsplitter 22 plays a role. The light produced by the image source 24 may be polarized or unpolarized. If the beamsplitter 22 is of a non-polarizing type, then a balanced situation is to have 50% of the light incident on the beamsplitter 22 be reflected and 50% transmitted. Thus, of the light 27a incident on the beamsplitter 22, 50% is reflected and sent toward the retro-reflector screen 23 as light 27b. Of the reflected light 27c from the retro-reflector 23, 50% of the light will be transmitted through the beamsplitter 22 and will travel to the viewer's eye 13. This configuration of the optical components 20 of the HMD 10 can transfer to the viewer's eye a maximum of 25% of the light produced by the image source 24. If desired, the beamsplitter 22 can be modified in ways that are well known to change the ratio of the reflected light to transmitted light thereby. Also, the beamsplitter 22 may include an anti-reflection coating so that all or an increased amount of the image comes from one side of the beam splitter and thus to reduce the likelihood of a double image.

Since the optical system 14 of the HMD 10 provides good resolution of the image and maintains the characteristics thereof, the image source can be a relatively inexpensive one that does not have to compensate for substantial loss of image quality that may occur in prior HMD systems. Furthermore, since a relatively large amount of the light provided by the image source 24 is provided to the eye 13 for viewing, e.g., since the retro-reflector can virtually focus the light for viewing at the eye, additional brightness compensation for loss of light, as may be needed in prior HMD systems, ordinarily would not be required.

For exemplary purposes, in FIG. 2 three light rays 40a, 40b, 40c (collectively 40) originating at the tip of the arrow 26 constitute a portion of the light 27. Three light rays schematically shown at 41a, 41b, 41c (collectively 41) also are examples of light emanating at the tail of the arrow 26. The light 27 has characteristics of the image 25 from or provided by or at the image source 24, and represented by the exemplary light rays 40 and 41, is focused by the focusing optics 21 onto the retro-reflector 23. The size of the image 30 seen as the arrow 31 on the retro-reflector 23 depends on the focal length of the focusing optics 21 and the distances between the image source 24 and the retro-reflector 23 from the focal points 43, 44 of the focusing optics 21. The image source 24 should be located relative to the focusing optics 21 such that an image can be focused, e.g., in focus as is shown in FIG. 2, at or approximately at the retro-reflector. For example, the image source 24 may be beyond the focal point 43 of the focusing optics 21, and the retro-reflector likewise preferably is beyond the focal point 44 of the focusing optics so that the image can be focused at the retro-reflector.

In the illustration of FIG. 2 the image 30 on the retro-reflector 23 is magnified relative to the size of the image at the image source 24; it does not have to be magnified. The image 30 may be the same size as the image 25 or it may be smaller. Thus, although the image source 24 may be relatively small and/or may provide a relatively small size image 25 at its output, the size of the image 30 viewed by the eye 13 may be different.

The optical system 14 is operable to place the image plane effectively at the retina of the viewer's eye 13. This is accomplished by effectively putting the plane of the eye lens (or pupil) 29 effectively at the position occupied by the focusing optics 21 relative to the source of the image provided to the focusing optics. In a sense the lens 21 is optically superimposed on the lens 29 of the eye 13.

The invention provides an optical system in which there are conjugate paths from a lens, such as focusing optics 14, which corresponds to the "lens means" of an optical sensor, e.g., the eye 13. Stated in another way, the invention presents visual information with a wide field of view by taking the output from a lens (focusing optics 21) and reflecting the light back onto the same lens, but actually direct that reflected light onto the eye. This is obtained by using the conjugate optics arrangement disclosed herein.

Figure 3:
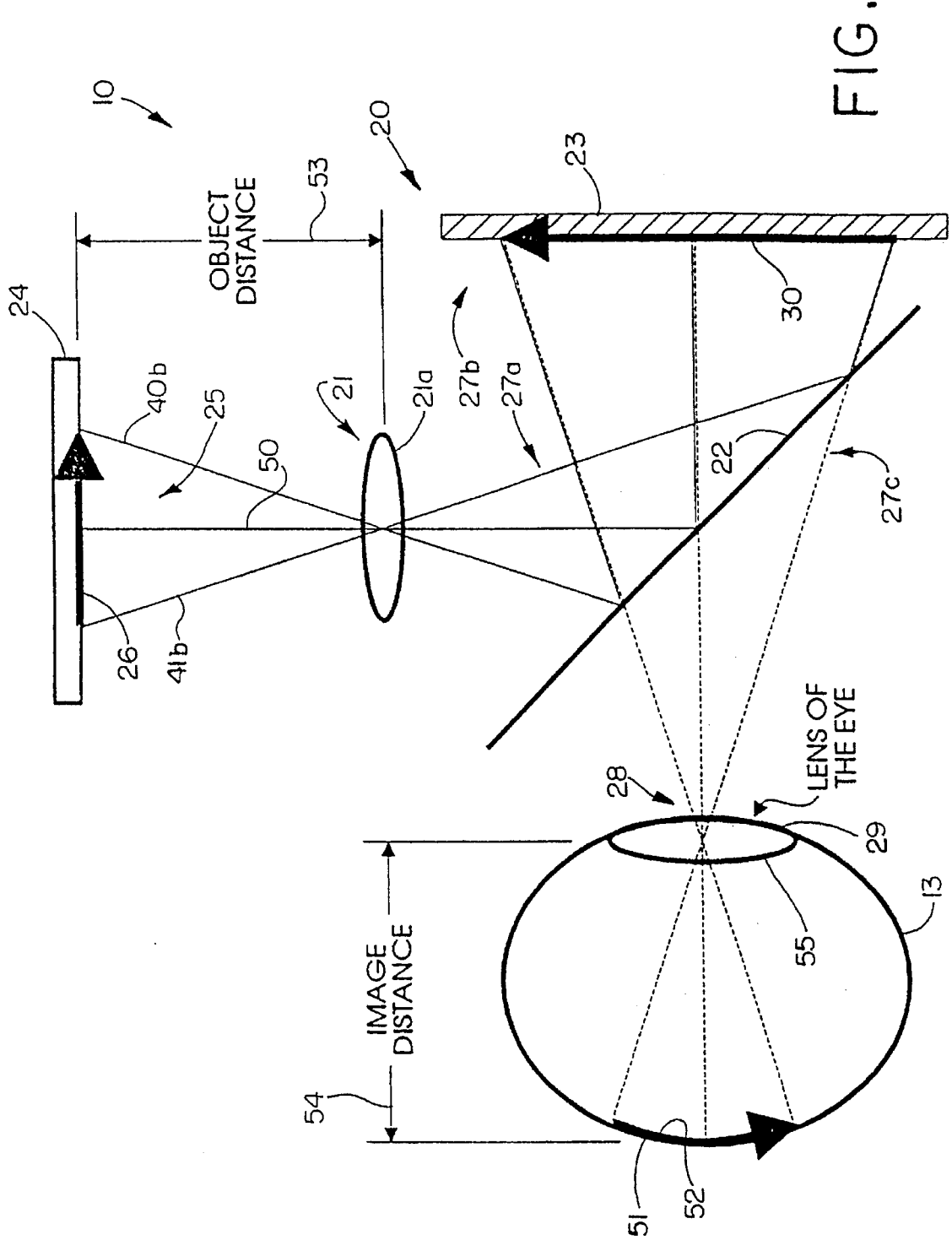
FIG. 3 is a schematic illustration of the HMD optical system showing the relationship of the size of the image on the retina of the viewing eye relative to the object to image distance.

Turning to FIG. 3, the arrangement of optical components in the optical system 14 of the HMD 10 is presented to demonstrate the obtaining of a wide field of view in accordance with the invention. As is seen in FIG. 3, exemplary light rays 40b, 41b originate from the respective ends of the image 25 arrow 26 at the image source 24, and light ray 50 originates from the center of the arrow 26. These light rays 27a pass through the focusing optics 21, here shown as a lens, are reflected by the beamsplitter 22, and are incident on the retro-reflector screen 23 as light 27b. The light rays are retro-reflected by the retro-reflector screen 23 as light 27c so that they converge, i.e., are focused, at a point 28 in space. As is seen in FIG. 3, when the pupil of a viewer's eye 13 is placed at this point 28 in space, lens 29 focuses the image onto the retina and it is possible to see the image 30.

To obtain a relatively wide field of view the entire retina 51 of the eye 13 may be filled with the image, shown at 52 in FIG. 3. The more the retina is filled, the wider will be the field of view. In the illustrated HMD 10 the magnification of the image 52 on the retina 51 equals the object distance between the image source 24 and the focusing optics 21, for example, which is shown at 52 in FIG. 3, divided by the image distance shown at 54. The image distance, of course, is the distance between the lens 55 of the eye 13 and the retina 51.

Also, in the arrangement of optical components 20 of the HMD as illustrated in FIG. 3, the pupil 30 of the eye 13 is located at a distance from the beamsplitter 22. This distance, which is usually considered in relation to "eye relief", also is determined by the f# of the focusing optics 21. By adjusting the parameters, such as f# and object distance, the eye relief can be made at any distance that is comfortable and convenient.

In operation of the HMD 10, light having characteristics of an image is provided by the image source 24. The focusing optics 21 directs the light to the beamsplitter 22, which reflects the light to the retro-reflector 23 for focusing approximately at or near the retro-reflector. Light is reflected by the retro-reflector to transmit through the beamsplitter and to reach the eye 13. The eye lens 29 focuses the light onto the retina 51 to see the image.

The back of the eye 13, e.g., the retina, in effect is at the image source 24 relative to the focusing optics 21, and the lens 29 of the eye in effect is at the focusing optics relative to the image source. Thus, the lens 29 of the eye stands relative to the image source 24 in the same relation as the lens of the focusing optics 21 stands relative to the image source. One has a full field of view as provided by the focusing optics. The location of the image seen by the eye 13 is a function of the plane at which the focusing optics focuses its projected image.

According to the invention, the HMD uses a retro-reflector, and the focusing optics 21 focuses the image from the image source at or approximately at the retro-reflector. Thus, a large amount, for example, substantially all the light from the focusing optics, can be directed by the retro-reflector and put at the eye 13. Of course, there may be other losses in the various components of the optical system, and there may be loss of light due to transmission of the incident light from the focusing optics onto the beamsplitter; and there may be reflection of light from the retro-reflector by the beamsplitter back toward the focusing optics and image source. Some of these losses are addressed in the several embodiments described further below. However, in view of the efficiency of the optical system 14 of the invention, only relatively low illumination level may be needed from the image source.

Using the invention it is possible to magnify the image from a relatively small display to cream a suitable image for viewing without having to place the optics and/or image source too close to the eyes, and, therefore, comfortable eye relief can be obtained. Furthermore, using a relatively simple and uncomplicated focusing optics 21, such as a single lens or a camera lens system, such as that used in a conventional SLR camera, it is possible to obtain a relatively good angle of view and good, comfortable eye relief. Using the invention it may be unnecessary to use an output objective or other objective that is placed rather close to the eye of the viewer while still providing an acceptable image for viewing.

For some magnification situations, as is described further in detail below, it is desirable to use a relatively short focal length focusing optics 21 such that the focal length thereof is less than that of the lens 29 of the eye 13 to the back of the eye. Also, to provide a relatively large or wide "sweet spot" or place where the eye 13 can be positioned relative to the optical system 14 and/or the output port 16, while still being able to see a good quality (bright, good resolution, and/or good contrast, etc.) image preferably also with a relatively wide field of view, it is desirable to use a relatively short focal length lens or focusing optics 21, and even more preferably to use such a focusing optics 21, indeed, optical system 14 overall, which has a relatively low f#.

It may be desirable to use lens (focusing optics) 21 having a relatively low f# and short focal length. The exit aperture size of the image lens 21 determines the size of the sweet spot. The optical system 14 can change the field of view between relatively wide and relatively narrow by changing the focal length of the focusing (projection) optics 21.

Summarizing the operation of the invention depicted in FIGS. 2 and 3, for example, light representing the image 25 provided by an image source, such as that shown at 24, is directed via the focusing optics 21 and beamsplitter 22 to the retro-reflector 23 to form a real image at or near the retro-reflector. Preferably a broad image field is focused at the retro-reflector. Light reflected by the retro-reflector 23 is directed toward the location 28 via the beamsplitter 22, and the lens 29 of an eye 13 may be placed at the location 28 to receive light reflected by the retro-reflector. The retina 51 (FIG. 3) is located at the image plane of the lens 29 which focuses the light there to form the viewed or seen image.

The optical components 20 used in the optical system 14 of the invention are operative in a sense as a viewer or in other words like an eyepiece or objective for use to view an image. The optical components 20 are able to provide the viewing or eyepiece function usually independently of the light source or source of images intended for viewing. Therefore, although the focusing optics 21 may provide the function of projecting an image or directing an image toward the retro-reflector 23, it will be appreciated that the invention may be considered, at least in part, as a viewer or a technique for viewing images rather than as a conventional projector which projects images onto a conventional movie screen. The invention may effectively make the image plane reflective to the eye(s) of a viewer; for example, the retro-reflector 23 reflects the light forming the real image toward the eye 13 which is able to view the image.

The size of the exit pupil of the optical system 14 as provided to the eye 13 is proportional to the diameter of the lens or focusing optics 21. If there are no other focusing type (lenses or mirrors, for example) optical components in the optical system 14 other than the lens 21, then the exit pupil of the optical system 14 will be the same as the diameter of the lens or focusing optics 21. Magnification is proportional to the focal length of the lens or focusing optics 21. However, if the focal length of the lens 21 is too short, the lens 21 and the exit pupil of the optical system 14 will not cover the entire field of the image source 24.

The location at which the image, which is provided by or viewed via the optical system 14, by the eye is a function of the plane at which the lens 21 focuses its projected image. That location can be at the retro-reflector 23, which is preferred if a relatively low quality retro-reflector is used; or that location can be behind or in front of the retro-reflector, which is especially possible when a relatively good quality retro-reflector is used.

The invention may be used to present a real image over a relatively wide field. For example, the angle of the field of view may be on the order of about 100 degrees using only a single retro-reflector. This is in contrast to many conventional heads up displays in which there is a relatively narrow field of view of an image, for example, on the order of 10–30 degrees, which is superimposed or adjacent part of a broader real view and which is image essentially focused at infinity.

Figure 4:
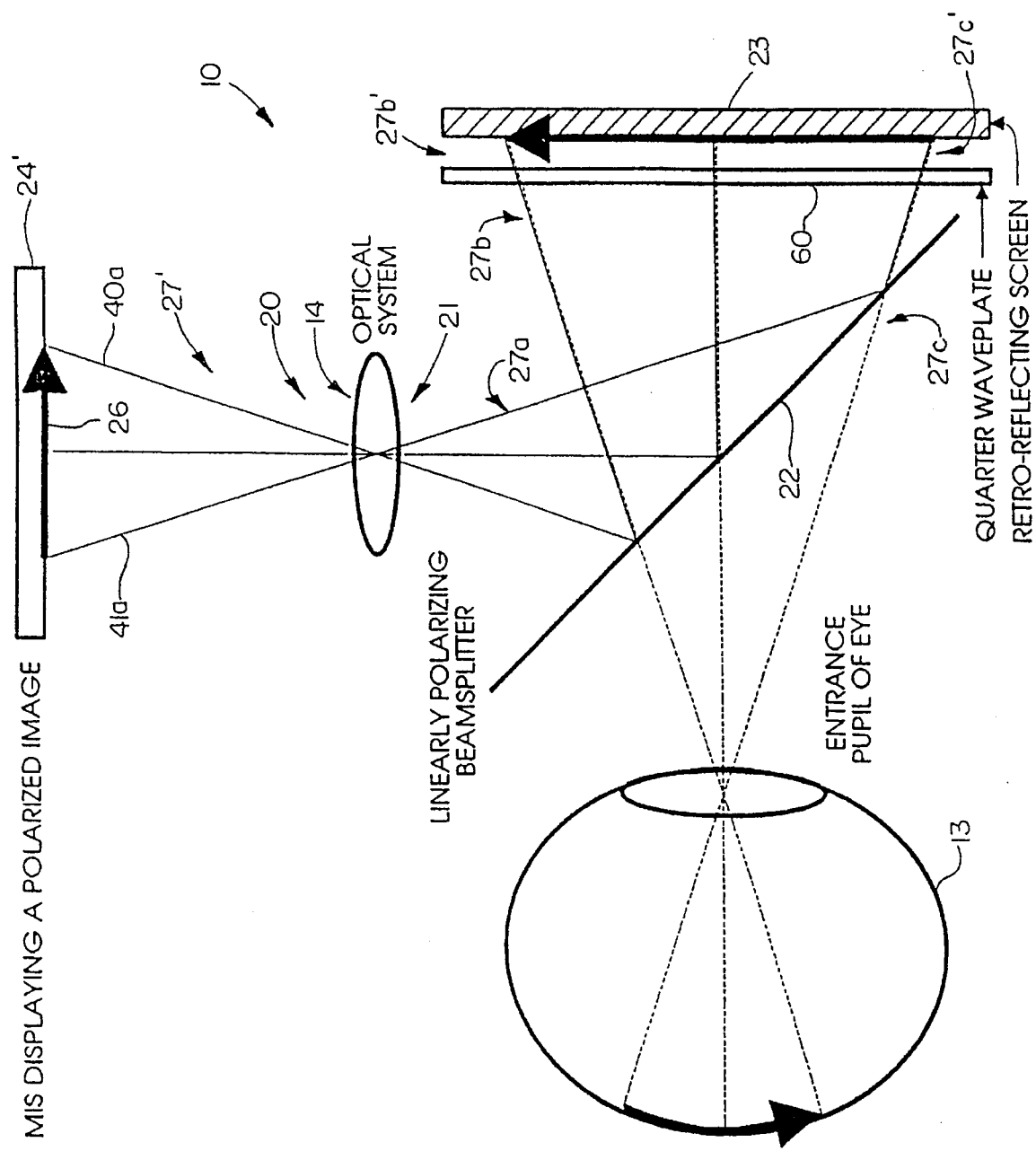
FIG. 4 is a simplified schematic illustration of an HMD optical system similar to FIG. 2 using a linear polarizing beamsplitter.

In FIG. 4 is a modified HMD 10 which includes an image source 24' that produces light that is linearly polarized (sometimes referred to as plane polarized). This actually is the case in many liquid crystal based image sources and is the case using the image source of the above-referenced copending U.S. patent application. Using an image source that produces linearly polarized light, it is possible to improve the efficiency of the illumination system of the HMD 10. Such improved efficiency system uses a beamsplitter 22' which reflects light having one linear polarization (direction of plane polarization) but transmits the other direction of linear polarization without attenuation. Such a beamsplitter 22' is known and can be made, for example, by depositing thin films on a clear substrate.

The light 27' produced by the image source 24 is linearly polarized at right angles to the plane of the page. The beamsplitter 22' is designed to reflect this polarization so that most, preferably all, of the incident light 27a is reflected as light 27b toward the retro-reflector 23. In front of the retro-reflector 23 is placed a quarter waveplate 60. Preferably the quarter waveplate is oriented such that the axis thereof is at 45 degrees to the plane of polarization of the linearly polarized light 27b incident thereon. However, if desired, the orientation of the quarter waveplate may be different.

The quarter waveplate 60 converts the linearly polarized light 27b into circularly polarized light 27b' of a given handedness. When this light is reflected by the retro-reflector 23 as light 27c', it will be converted into circularly polarized light of the other handedness. When the light 27c' passes back through the quarter waveplate 60, such light is converted from circularly polarized light back into linearly polarized light 27c, but, this time, the axis or plane of polarization will be in the plane of the page, i.e., relatively orthogonal or perpendicular to the plane of polarization of the linearly polarized light 27b.

The light 27c with such linear polarization will be transmitted, preferably all of it will be transmitted, by the polarizing beamsplitter 22'. The light transmitted through the polarizing beamsplitter 22' then travels to the viewer's eye 13. It will be appreciated that the polarizing system, polarizing efficiency, etc., of the various elements and light in the HMD 10 shown in FIG. 4 ordinarily will not be 100% nor will the conversions between linearly polarized light and circularly polarized light be perfect. These non-idealities reduce the actual percentage of light transmitted to the viewer.

Figure 5:
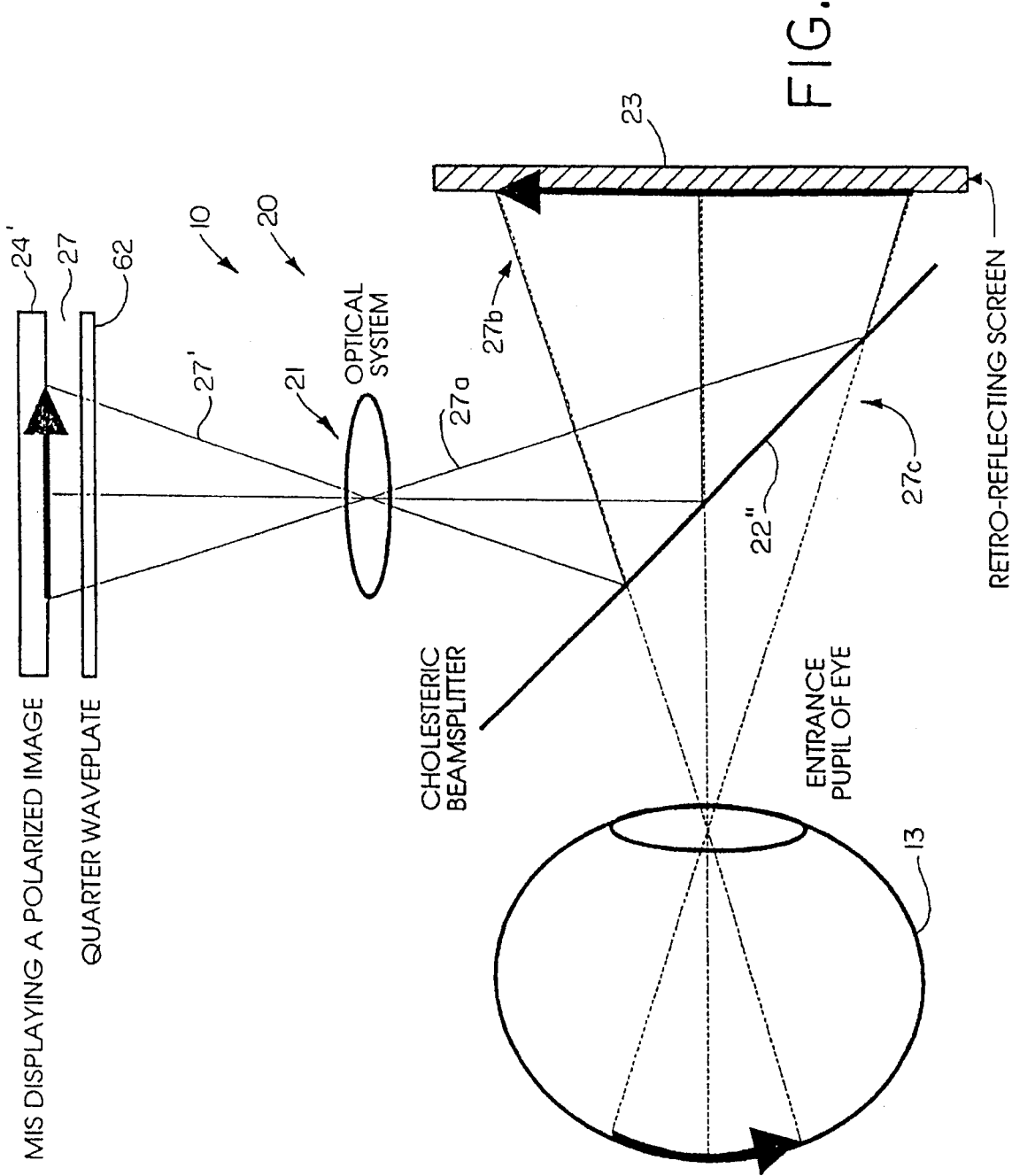
FIG. 5 is a simplified schematic illustration of an HMD optical system similar to FIG. 2 using a cholesteric liquid crystal beamsplitter.

FIG. 5 illustrates a variation of the HMD which uses an image source 24' that develops linearly polarized light and a wave plate 62, such as a quarter wave plate, that is oriented with its axis at 45° to the plane of polarization thereby to convert the plane polarized light from the image source to circularly polarized light of a particular handedness (direction, e.g., left or right circularly polarized light). Alternatively, the image source may produce light which is circularly polarized, and in this case it may not be necessary to use a wave plate. The focusing optics 21 directs the circularly polarized light 27' onto the beamsplitter 22". The beamsplitter 22" reflects one circularly polarized handedness light and transmits the other handedness. An example of such a beamsplitter is one which uses cholesteric liquid crystal material, as is known.

The beamsplitter 22" reflects light of the incident handedness from the focusing optics onto the retro-reflector 23; and upon reflection by the retro-reflector, the direction of circular polarization is reversed. Therefore, light incident on the beamsplitter 22" from the retro-reflector 23 transmits through the beamsplitter to the eye 13. Because a cholesteric beamsplitter can be a more efficient polarizer than a thin film beamsplitter, it is possible that the cholesteric based optical system of the HMD in FIG. 5 will deliver more light to the viewer than the HMD 10 of FIG. 2, for example.

Furthermore, it will be appreciated that although the invention is described and illustrated herein as having the beamsplitter reflect light from the image source to the retro-reflector; and then the beamsplitter transmits light from the retro-reflector to the eye, other arrangements of the optical components also are possible. An example of another such arrangement would have the image source, beamsplitter and retro-reflector in a straight line so the beamsplitter transmits light from the image source and focusing optics to the retro-reflector; and light that is reflected by the retro-reflector is reflected by the beamsplitter to the eye for viewing.

The human eye is most comfortable when viewing an image at a distance of about twenty inches, approximately at the distance at which one would place a book, document, etc. to be read. It is desirable that the final image as seen by the viewer be located at such distance, e.g., approximately twenty inches from the pupil 29 of the eye. This can be accomplished in the manner illustrated in FIG. 6. The retro-reflector 23 on which the focused image from the image source 24 is moved to twenty inches from the pupil 29 of the eye 13. A disadvantage with this system, though, is the large size of the HMD 10 required to provide such distance between the eye and the retro-reflector.

Figure 6:
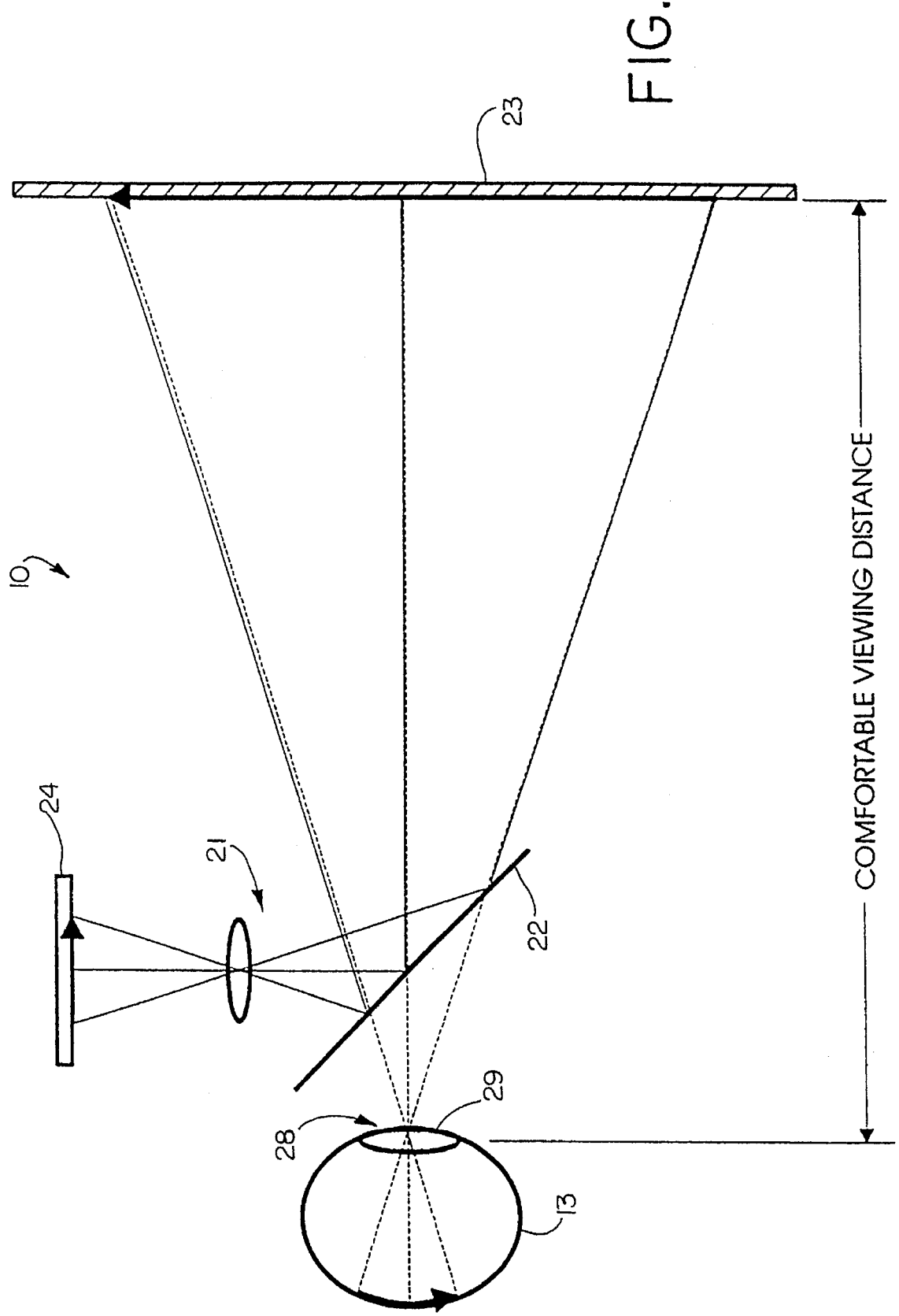
FIG. 6 is a simplified schematic illustration of an HMD optical system similar to FIG. 2 showing a comfortable viewing distance for the eye.
Figure 7:
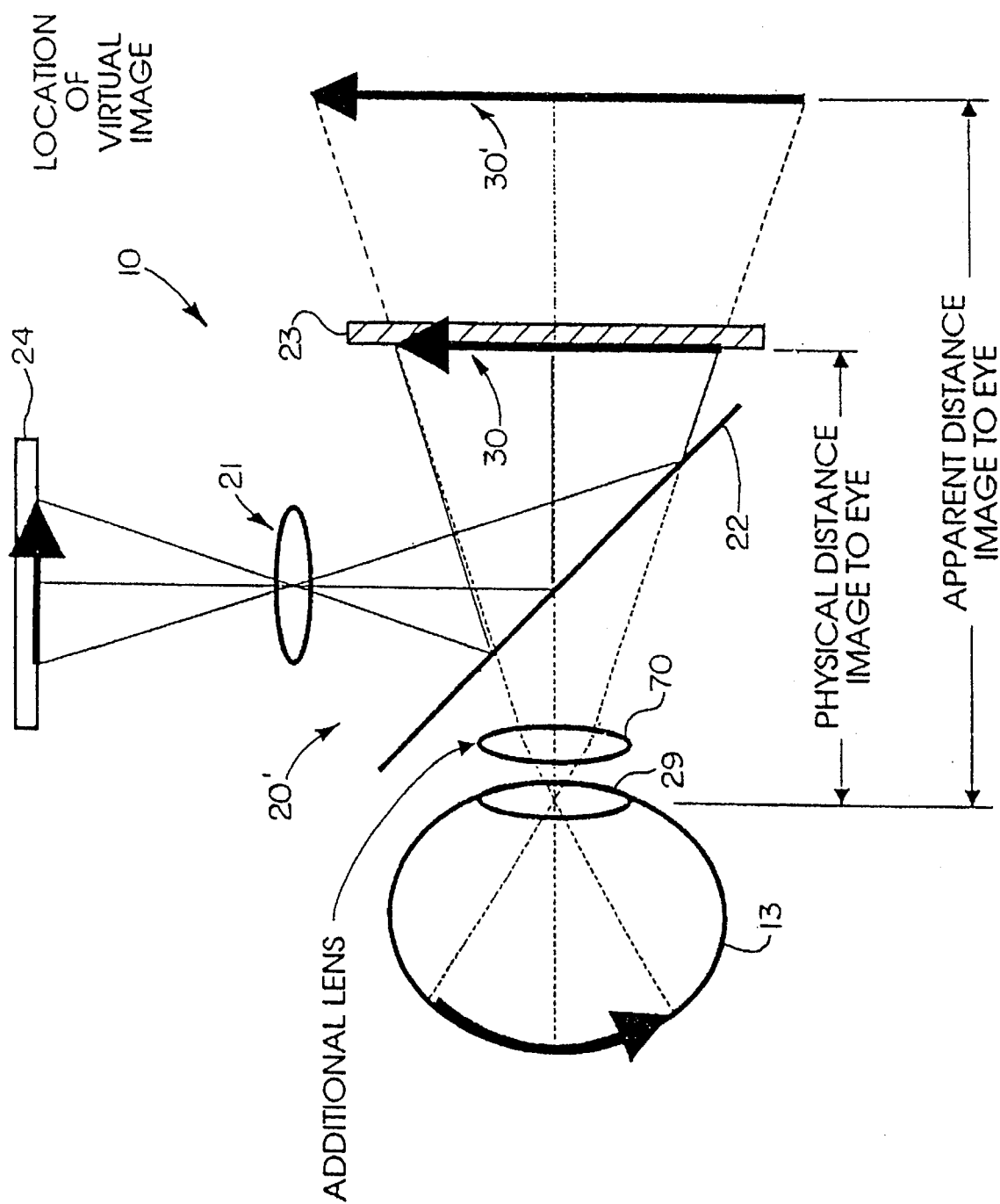
FIG. 7 is a schematic illustration of a modified HMD optical system similar to FIG. 2 using an additional lens component to obtain comfortable viewing distance while reducing the actual size of the system.

The HMD can be made more compact compared to the HMD illustrated in FIG. 6 by adding an additional optical system 70 between the beamsplitter 22 and the eye 13. In FIG. 7 such optical system 70 is depicted as a single lens; however, it will be appreciated that it may include other optical components as was mentioned above, for example, with respect to the focusing optics 21. In the HMD 10 of FIG. 7 the retro-reflector 23 is closer to the eye 13 than it is in FIG. 6 making a more compact system. The viewer is provided with a virtual image 30' of the image source 24 at the desired viewing distance (twenty inches, for example) by the cooperation between the focusing optics, retro-reflector, and additional optical system 70.

In the example of FIG. 7, the additional viewing lens 70 may be, for example, about 10 diopters. To present to the eye 13 an image which appears at a comfortable viewing distance, such as about 20 inches or more away, the lens 70 may be located from about ½ to 1 inch in front of the eye. Although in many viewing devices further spacing between the eye and the optical component of the optical system nearest the eye may be desired to obtain desired eye relief, the use of lens 70 at the indicated distance of about ½ to 1 inch from the eye usually is acceptable and reasonably comfortable because that is the approximate spacing of ordinary eye glasses to which people ordinarily relatively easily become accustomed.

The function of the lens 70 may be obtained by using a negative lens at the focusing optics 21.

Figure 8:
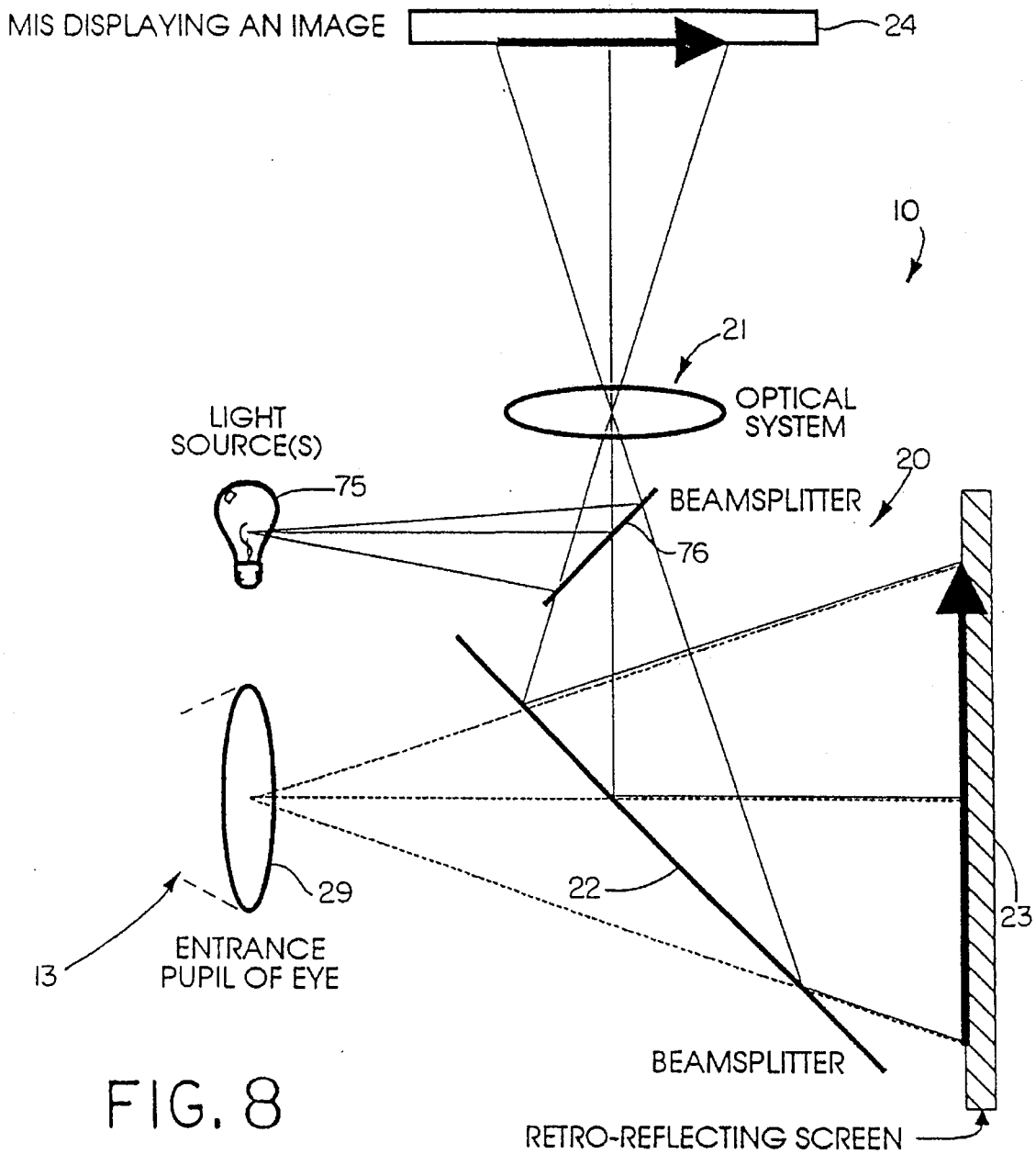
FIG. 8 is a schematic illustration of an HMD optical system similar to FIG. 2 including a light source.
Figure 9:
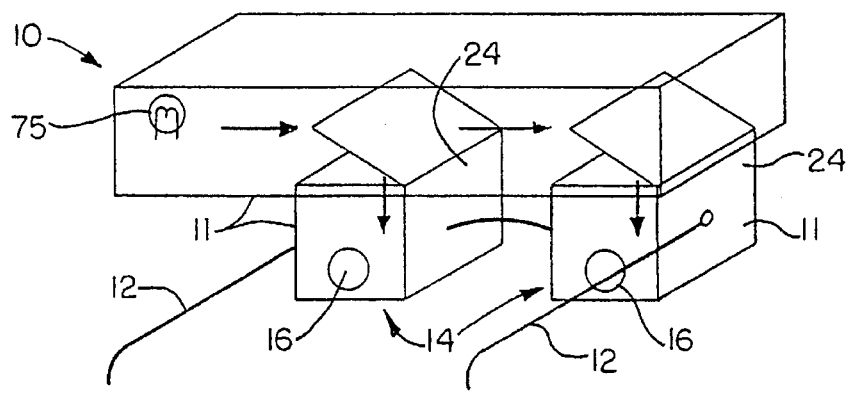
FIG. 9 is a schematic illustration of an HMD optical system similar to FIG. 10 including an example of a shared light source for two display devices used in a system according to the invention.

FIGS. 8 and 9 depict means to provide light to illuminate a reflective image source 24. The light source 75 can be of any type including multiple light emitting diodes. The configuration illustrated in FIG. 8 has the light source located in the plane of the page as are all other components of the optical system 14. Light from the source 75 is reflected by an additional beamsplitter 76 to the image source 24. Light from the image source 24 is transmitted through the focusing optics 21 and additional beamsplitter 76 to the beamsplitter 22. The remaining operation of the retro-reflector 23, beamsplitter 22 and eye 13 are as was described above with respect to the above embodiments, for example. In FIG. 9 the light source 75 is rotated relative to the orientation shown in FIG. 8, so that the light source can provide illumination of two respective image sources 24 and respective optical systems 14 in a two unit HMD for viewing of respective images simultaneously by both eyes of a person.

Figure 10:
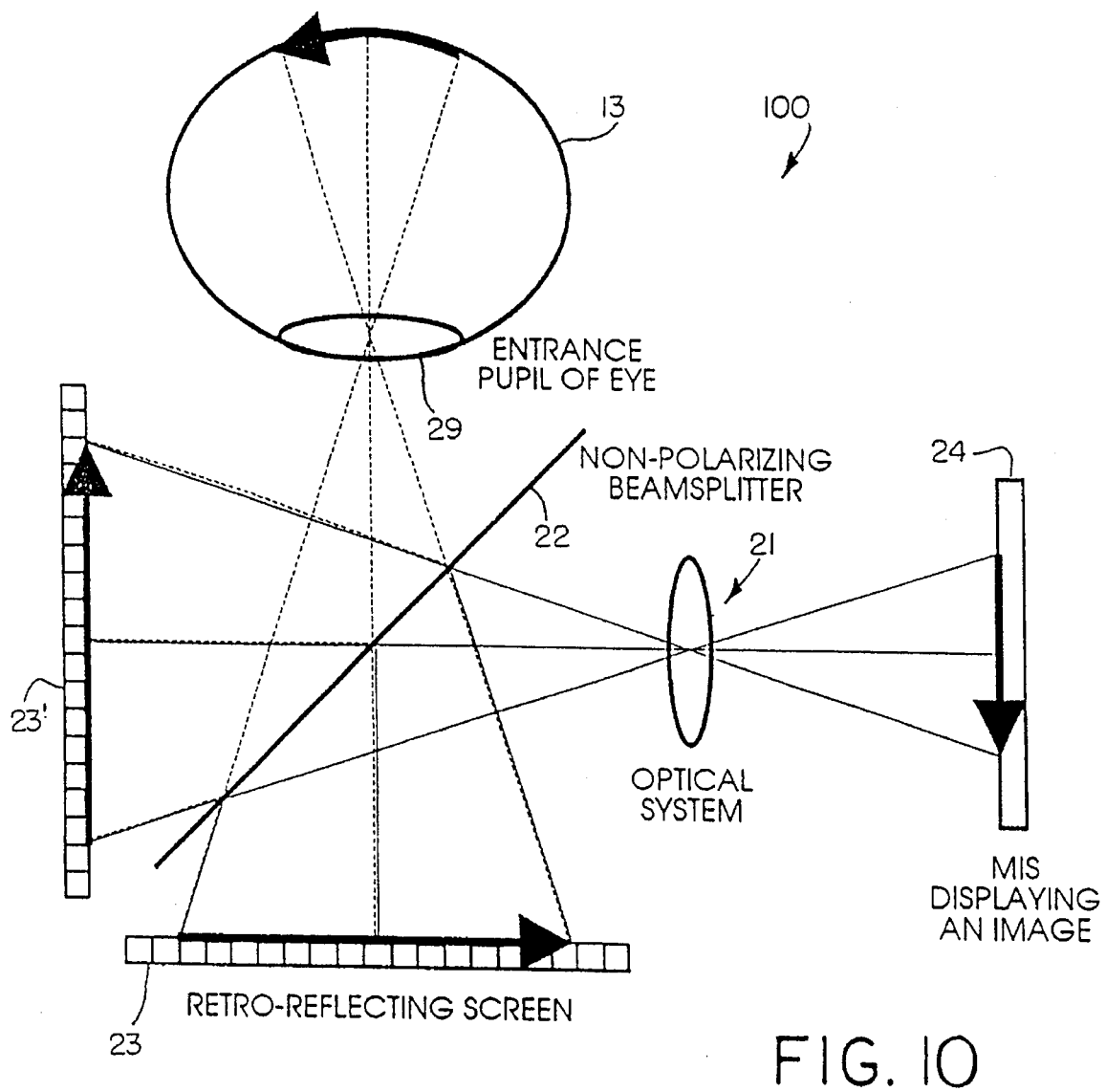
FIG. 10 is a schematic illustration of another embodiment of HMD using plural retro-reflectors, respectively, positioned relative to the beamsplitter.

FIG. 10 illustrates another embodiment of HMD 100, features of which can be used with the several embodiments described above. In particular, an additional retro-reflector 23' is added at an orientation and location relative to the beamsplitter 22 and the original retro-reflector 23 such that the additional retro-reflector reflects light from the image source that previously was lost to the optical system 14. Specifically, light from the focusing optics 21 and image source 24 is reflected by the beamsplitter 22 to the retro-reflector 23, and the retro-reflector 23 reflects light to the beamsplitter for transmission to the eye 13. Additionally, light from the focusing optics 21 which is transmitted through the beamsplitter 22 to the additional retro-reflector 23' is reflected by the additional retro-reflector 23' back to the beamsplitter 22 for reflection to the eye 13. Although some light from the retro-reflector 23 may be reflected by the beamsplitter back to the image source 24 and some light from the additional retro-reflector 23' may be transmitted through the beamsplitter to the image source 24, such light is not necessarily lost to the optical system 14 of the HMD 100. Rather, such light may be used to increase the brightness of the light incident on the image source when such source is a reflective one, and, thus, further increase the brightness of the image viewed by the eye 13.

It will be appreciated that the HMD 100 increases the amount of light to the viewer, and, thus, increases the brightness of the output image while minimizing the illumination requirements of the optical system 14.

Figure 11:
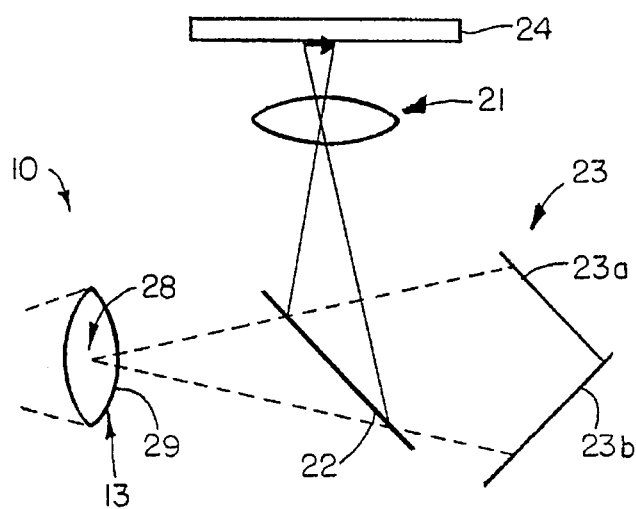
FIG. 11 is a schematic illustration of HMD using a multiple part retro-reflector.
Figure 12:
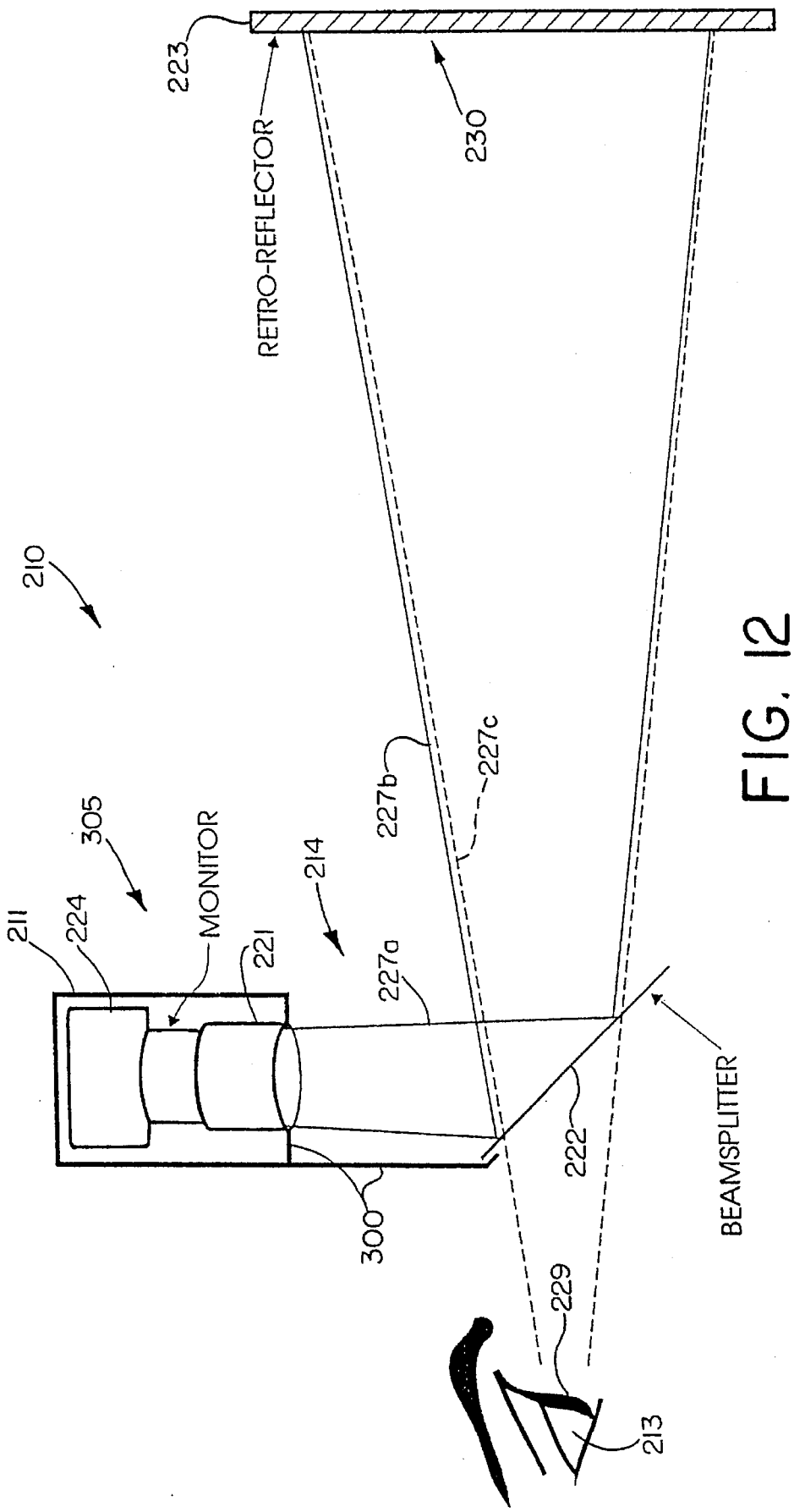
FIG. 12 is schematic illustration of a heads-up/see-through display system utilizing conjugate optics to view an image in a relatively wide head box.

In some instances it is possible that the retro-reflector may not be perfectly flat or that it is not sufficiently large for the HMD. It has been found that the orientation of the retro-reflector 23 in the optical systems of the several embodiments described and illustrated may be other than flat and/or may be in multiple parts. Moreover, the parts need not be perfectly flat or parallel; rather the several parts can be in different orientations, provided the orientations are sufficient to provide the desired retro-reflection function described herein. An example of such non-parallel or linear orientation of a retro-reflector 23a, 23b is illustrated in FIG. 11. An HMD 10 using such multiple part retro-reflector 23a, 23b, without regard to whether the retro-reflector is flat or the parts thereof are parallel, has been found to be functional in the manner described above to provide images for viewing by the eye 13.

Referring, now, to FIGS. 12–17, another embodiment of display and viewing system 210 in accordance with the invention is illustrated. The various components and features of the invention described in the several embodiments presented above may be used in the embodiment of FIGS. 12–17, as will become further evident from the description below. In FIGS. 12–17 the same reference numerals as were used above to designate similar parts in the embodiments of FIGS. 1–11 are used with the addition of the value 200. Therefore, reference numerals 210, 213, etc., generally corresponds to reference numerals 10, 13, etc., described above.

The display and viewing system 210 in a sense is a hybrid head mounted display in that the housing 211 contains or supports the focusing optics 221, beamsplitter 222 and image source 224 and may be mounted on the head or in a position where the head can be placed relatively near thereto to view an image, and the retro-reflector 223 is relatively remotely located and does not necessarily have to be located in, on or attached with respect to the housing 211. The optical system 214 includes the focusing optics 221, beamsplitter 222 and retro-reflector 223, but the retro-reflector may be located relatively remotely with respect to those other components of the optical system.

In using the display and viewing system 210, light 227a shown in solid lines from the image source 224 is directed from the focusing optics 221 via the beamsplitter 222 and then as light 227b toward the retro-reflector 223; and that light is so focused as to form a real image at the retro-reflector or in front or behind the retro-reflector. Since the retro-reflector 223 may have some dispersion or beam spreading characteristics, e.g., it is not perfect, and since the retro-reflector may be relatively far from the beamsplitter and focusing optics, it may be desirable to focus the real image at the retro-reflector, e.g., in the plane thereof if the retro-reflector is flat. The retro-reflector 223 reflects the incident light in a conjugate path 223a as light 227c toward the beamsplitter 222 via which the light reaches the eye 213, as is shown by the dotted lines in FIG. 12, for example.

The housing 211 may include a support 300 for supporting a plurality of image sources 224L (left) and 224R (right), and associated focusing optics 221L and 221R for directing light via a shared beamsplitter 222 or separate respective beamsplitters along the path represented by light 227b. It will be appreciated that the beamsplitter 222 may be a single one having shared by both image sources and focusing optics with respective left and right eye light paths reflected by or transmitted through respective left and right portions of the beamsplitter; or the beamsplitter may be divided as two separate ones, each positioned in a respective one of the light paths to operate in the manner described herein. In FIG. 14 the left eye 213L image is provided by the image source 224L and the right eye image is provided by the image source 224R; light from those image sources is shown directed along respective light paths 227bL and 227bR.

The housing 211 and support 300 may be mounted on the head 301 of a person by appropriate headgear 302 shown in FIGS. 13–16, for example. Various types of headgear are known in the art and may be used for this purpose. It is desirable to minimize the mass and size of the headgear, and, therefore, a rather simple form such as that shown using circumferential and top straps may be used. Size adjustments 303 may be used, as is shown schematically in FIG. 13. This is consistent with the use of a relatively remotely located retro-reflector which does not have to be supported on the headgear 302 or housing 211 in this embodiment. Since the retro-reflector is relatively remotely located the size and weight of the housing 211 and of those portions of the optical system 214 which would have to be otherwise supported on or with respect to the head of a person can are reduced relative to the embodiments described above with respect to FIGS. 1–11, for example.

An electrical cable 304 may provide electrical power and image signals to the respective image sources 224L, 224R. Other means may be used for these purposes. For example, a battery power supply may be mounted on the headgear 302 and/or housing 211; and other means may be used to couple image or information signals to the image sources 224, e.g., radio or optical transmission, etc. The image signals may be provided by optical cable or some other means from a remote source and those optical image signals may be directed to the focusing optics 221 for forming a real image at the retro-reflector 223. Various other equivalent means may be used to provide power and a source of image signals.

The embodiment of display and viewing system 210 as a number of advantages and distinctions from the system 10. The head box becomes inherently large. It is possible to look directly through the beamsplitter 222 to see images and objects essentially the same as one would see them when looking through a clear medium, such as glass or plastic. As will be evident from the description hereof, images from the image sources 224 will be directed to the eyes of the person or apparatus wearing or using the system 210 only when light 224b is incident on a retro-reflector. That portion of the system 210 which would be mounted on the head is relatively lighter weight because there is no need to support the retro-reflector thereon.

When a user looks in a direction other than at a retro-reflector, the image(s) from the image source(s) 224 will not be returned and all that is seen is a view of the "outside world". Additionally, the headgear 302 and system 210 not only permit an unobstructed view of the outside world, but also accomplishes this with enough eye relief to allow the user easily to wear eye glasses. This is particularly beneficial if the user requires bifocals, in which case if the user looks down, the beamsplitter 222 is not encountered at all. Therefore, the bifocal eye glasses permit the user to perform close-up tasks as normal and, if desired, to look up through the beamsplitter toward a retro-reflector material to see the image(s) originating from the images source(s) 224.

The image reflected by the retro-reflector 223 for viewing by a user of the system 210 is relatively private due to the conjugate optical paths along which light travels from the image source(s) via the beamsplitter(s) to the retro-reflector and then back via the retro-reflector to the eye(s) of the user. The retro-reflector preferably has relatively little beam spread so other people in a room, for example, may not even know that a user is seeing an image reflected by a retro-reflector in the room.

In using the system 210, a user wears the housing 211 on which the two image sources 224L, 224R, which may be considered, in combination with the respective focusing optics 221, projectors 305 (e.g., 305L, 305R for left and right eye images, respectively) in view of the fact that they project light. The headgear 302 may be adjusted for comfortable fit. A retro-reflector is placed anywhere the user wishes to see an image. For example, if the user is sitting at a desk, the retro-reflector may be placed flat on the desk similar to a piece of paper. Alternatively, the retro-reflector could be oriented in a position similar to the front of a computer monitor or other type of display device. The user would see the image only when looking at the retro-reflector. It is only in this circumstance that the light emitted by a projector(s) (image source 224 and focusing optics 221) would be returned to the user's eye(s). When the user looks in another direction, the projector image is not returned, and all that is seen is a view of the outside world.

Since there are two projectors 305L, 305R, the image can be stereoscopic or three dimensional. To get a good quality stereoscopic imagery, it is necessary that the right eye image not be seen by the left eye and vice versa. In order to assure that this is the case consideration may be given to the design of the system 211, as follows. The light returned from the retro-reflector 223 actually has some small divergence, e.g., on the order of a few milliradians, as the retro-reflector likely would not be a perfect retro-reflector that reflects all incident light precisely along respective perfect conjugate optical paths. This spread in the reflected or returned light beam means that there is a maximum distance between the user and the retro-reflector for which the images to the eyes do not overlap, as is illustrated in FIG. 15. In the illustration of FIG. 15, it will be appreciated that all light emanating from the left projector 305L and directed as light 227bL toward the retro-reflector is reflected by the retro-reflector 223 as light 227cL to the left eye 13L; and even though there is some beam spread of light reflected by the retro-reflector, none of the spread light reaches the right eye 13R. Similarly the light from the right projector 305R is directed to the right eye 13R and does not reach the left eye.

However, as is illustrated in FIG. 16, there is relatively more beam spread that occurs in the light reflected by the retro-reflector 223 because the retro-reflector is further from the housing 211 than is the case in the illustration of FIG. 15. The increased beam spread also or additionally may be due to a lower quality retro-reflector in the illustration of FIG. 16 than that used in the illustration of FIG. 15. In FIG. 16 it is seen that light 227bL (the light envelope of which is represented solid lines) is directed from the left projector 305L to the retro-reflector 223. However, the light reflected by the retro-reflector 223 as light 227cL spreads in a sufficiently wide pattern that some is received by the left eye 13L but some also is received by the right eye 13R. Similarly, in the illustration of FIG. 16 light from the right projector 305R may be spread sufficiently wide as to be received upon reflection by the retro-reflector 223 also by the left eye 13L.

The overlapping images degrades the operation of the system 210 for stereoscopic image viewing. Therefore, when the viewed images are to provide stereoscopic views, it is desired that the left and right eye images would not overlap. This can be accomplished, for example, by using a relatively good quality retro-reflector with small beam spread or by locating the retro-reflector remotely of the housing 211 but sufficiently close so that the beam spread does not result in image overlap.

For the user to see a relatively sharp image it usually is necessary for the projector(s) 305 to be focused on the plane of the retro-reflector 223, e.g., to focus a real image there. If the retro-reflector to user distance is relatively fixed, then the focus of the system 210 can be set up at the time of initial use. However, if the situation is such that the system 210 is to be used in a variety of retro-reflector to user distance conditions, then a manual adjustment can be provided to adjust the focus of both focusing optics systems 221L and 221R separately or simultaneously in order to obtain the desired focusing mentioned. Such manual focus control adjustment 309 is shown schematically in FIG. 17.

As also is shown in FIG. 17, an automatic focus control can be provided. An automatic focus control device, such as that used in a conventional automatic focusing camera, may be used for this purpose as is indicated at 310. The automatic control 310 may include an ultrasonic emitter and detector 311 which may be mounted on the headgear 302, for example, or elsewhere to provide a measurement or detection of the distance of the retro-reflector from the focusing optics 221L, 221R. The time required for a round trip pulse allows the calculation of the distance. The focusing optics or lenses 221L, 221R can be adjusted to proper focus by the focus control 312 according to such distance information. Other types of distance measuring and/or control devices also may be used in accordance with this focusing feature of the invention.

Although the system 210 shown in FIGS. 12–17 show use of two projectors 305L, 305R, it will be appreciated that a single projector may be used to develop the images. The images may be provided in field sequential fashion to alternate eyes using optical dividing devices, such as reflectors and beamsplitters, not shown, in order to obtain stereoscopic images. Alternatively, the images to the left and right eyes may be essentially the same and produced either in field sequential manner or simultaneously to obtain a planar (non-stereoscopic) image for viewing in the manner described herein.

In view of the foregoing, it will be appreciated that the present invention may be used to display images for viewing by using conjugate optics techniques.

I claim:

1. A head mounted display system for providing images for viewing by at least one eye of a viewer, comprising a mounting structure for mounting on the head of a viewer, a liquid crystal display image source carried by the mounting structure for providing images for viewing by one eye of a viewer, a retro-reflector remotely located relative to said image source and the viewer and having a characteristic of providing a conjugate optical path leading to said eye of a viewer, focusing optics carried by the mounting structure in position to receive light from the image source to form a real image, said mounting structure including means for holding said beamsplitter and focusing optics with respect to the head of a viewer to orient said focusing optics and said beamsplitter with respect to said eye of the viewer such that said focusing optics and said beamsplitter are in substantially the same relation to each other as the pupil of said eye of a viewer stands in relation to said beamsplitter to permit said eye to view an image from said image source when light representing that image is reflected in said conjugate optical path.

2. The system of claim 1, wherein said focusing means, beamsplitter means and retro-reflector are-cooperative to provide to the retina of said eye of the viewer an image such that the display area of the image source and the size of the area of the image on the retina of said eye of the viewer are substantially the same size.

3. The system of claim 1, wherein said focusing means, beamsplitter means and retro-reflector are cooperative to provide to said eye of the viewer an image that is covers substantially a 100 degrees field of view using only a single retro-reflector.

4. A method of display, comprising forming a real image from an image source, and reflecting the image to an eye of an observer such that the size of the area of the image on the retina of that eye is approximately the size of the display area of the image source.

5. A head mounted display for presenting an image for viewing by a viewer, comprising a mounting structure mountable on the head of a viewer, a liquid crystal display image source carried by the mounting structure and providing an image output for viewing by one eye of a viewer, focusing optics carried by the mounting structure in position to receive light from the image source to form a real image, a retro-reflector having a characteristic of providing a conjugate optical path leading to said eye of a viewer, a beamsplitter carried by the mounting structure in position to receive light from the focusing optics and image source and to direct the light toward said retro-reflector, and said mounting structure including means for holding said beamsplitter and focusing optics with respect to the head of a viewer to orient said focusing optics and said beamsplitter with respect to said eye of the viewer such that said focusing optics and said beamsplitter are in substantially the same relation to each other as the pupil of said eye of a viewer stands in relation to said beamsplitter to permit said eye to view an image from said image source when light representing that image is reflected in said conjugate optical path, and said retro-reflector being located remotely relative to 'said focusing optics and beamsplitter.

6. The display of claim 5, said mounting structure comprising head gear for mounting on the head of a viewer.

7. The display of claim 6, wherein the size of the display area of the image source is substantially the size of the image on the retina of said eye of the viewer.

8. The display of claim 5, wherein said retro-reflector is in said conjugate optical path receiving light from said beamsplitter and reflecting light back toward said beamsplitter.

9. The display of claim 5, said focusing optics having an input to receive light from said image source and wherein said image source, said beamsplitter and said focusing optics are cooperatively related effectively to place the lens of said eye at said input to said focusing optics receiving light from said image source.

10. The display of claim 9, said focusing optics having an input to receive light from said image source, and wherein the entrance pupil of said eye forms the exit pupil of the display.

11. The display of claim 5, wherein said retro-reflector is positioned to reflect in said conjugate optical path light directed to said retro-reflector by reflection from said beamsplitter.

12. The display of claim 11, wherein said beamsplitter is positioned relative to the conjugate optical path to direct light received from the retro-reflector toward a viewer for viewing.

13. The display of claim 5, comprising a further image source, said image source and further image source being operative to present to the respective eyes of a viewer respective images.

14. The display of claim 5, comprising a further image source cooperative with said image source to present to the respective eyes of a viewer respective images to form a stereoscopic view.

15. The display of claim 14, further comprising in optical relation to said further image source, a further beamsplitter, and further focusing optics, and said means for holding including means for holding said further image source, said further beamsplitter and said further focusing optics with respect to the head of a viewer to orient said further focusing optics and said further beamsplitter with respect to the other eye of the viewer such that said further focusing optics and said further beamsplitter are in substantially the same relation to each other as the pupil of such other eye of a viewer stands in relation to said further beamsplitter to view an image from said further image source when light is reflected in a respective conjugate optical path including a portion leading to such other eye.

16. The display of claim 5, comprising a further image source to present an image for viewing by a viewer, said image source and said further image source producing respective images, and said means for holding comprising means for holding each of said image sources in fixed relationship with a respective eye of a viewer to view an image from the respective image source.

17. The display of claim 5, wherein said focusing optics and said eye of a viewer are positionally related to each other along said conjugate optical path in mirror image relation to said beamsplitter.

18. The display of claim 5, wherein said focusing optics and retro-reflector are cooperative to place said image source and retina of said eye of the viewer in conjugate relation.

19. The display of claim 18, wherein the display area of the image source and the size of the area of the image on the retina of said eye of the viewer are substantially the same size.

20. The display of claim 18, wherein the display area of the image source and the focusing optics are cooperatively related to provide an image on the retina of said eye of the viewer that substantially fills the retina.

21. The display of claim 18, wherein the focal length of the focusing optics is substantially the same as or smaller than the focal length of said eye.

22. The display of claim 5, wherein said focusing optics and retro-reflector are cooperative to place said focusing optics and the pupil of said eye of the viewer in conjugate relation.

23. The display of claim 5, wherein said focusing optics comprises means to focus light from the image source to form a real image with respect to the retro-reflector.

24. The display of claim 5, wherein the focusing optics, beamsplitter and conjugate optical path are cooperative to present an image at a viewing location for viewing by said eye of a viewer such that the lens of said eye at the viewing location stands relative to the image source in the same relation as the focusing optics stands relative to the image source.

25. The display of claim 5, wherein said beamsplitter comprises a cholesteric liquid crystal material for reflecting light having one direction of circular polarization and for transmitting light having a different direction of circular polarization.

26. The display of claim 25 further comprising means for providing from the image source circularly polarized light, and wherein said retro-reflector is operative to reverse the direction of circular polarization of circularly polarized light incident thereon, and further comprising means for providing from the image source circularly polarized light, and wherein said retro-reflector is operative to reverse the direction of circular polarization of circularly polarized light incident thereon.

27. The display of claim 26, wherein light provided to the retro-reflector is plane polarized for reflection or transmission by the beamsplitter, and further comprising a quarter wave plate in the optical path between the beamsplitter and retro-reflector oriented to convert plane polarized light to circularly polarized light, and wherein said retro-reflector reverses the direction of circular polarization of circularly polarized light incident thereon, whereby upon transmission through the quarter wave plate such reflected light is converted to plane polarized light having a different direction plane of polarization than the light initially provided to the retro-reflector.

28. The display of claim 5, wherein said image source includes means to provide an image output that has optical polarization characteristic, and said beamsplitter comprises a polarizing beamsplitter cooperative with the polarization characteristic of the image source to reflect light having one polarization characteristic and to transmit light having the opposite polarization characteristic.

29. The display of claim 5, further comprising an optical system that forms a virtual image of light in the conjugate optical path for viewing at the viewing location.

30. The display of claim 29, said optical system comprising a lens.

31. The display of claim 5, said means for holding comprising a housing for at least partly containing said beamsplitter and focusing optics.

32. The display of claim 31, said means for holding comprising means for mounting the image source with respect to the housing.

33. The display of claim 32, comprising a further image source, said image source and further image source being operative to present to the respective eyes of a viewer respective images, said means for holding comprising a support structure supporting the housing in position for relative placement with respect to the head of a viewer to provide respective images to the eyes of the viewer.

34. A method for viewing an image, comprising directing light from a liquid crystal display image source for viewing by an eye of a viewer, the image source being mountable with respect to the head of a viewer, said directing including directing light via focusing optics and a beamsplitter toward a remotely located retro-reflector which has a characteristic of reflecting incident light along a conjugate light path, said directing including forming a real image, reflecting light by the retro-reflector along such a conjugate light path for viewing by a viewer, and positioning the pupil of the eye of a viewer to stand in the same relation to the beamsplitter as the focusing optics stands in relation to the beamsplitter to view an image from the image source when light is reflected in the conjugate light path.

35. The method of claim 34, said directing including directing light from the focusing optics via the beamsplitter to the retro-reflector and said reflecting light comprising directing light reflected by the retro-reflector via the beamsplitter to the eye for viewing.

36. The method of claim 34, said directing comprising presenting such image for viewing by one eye of a viewer and presenting an image to the other eye of the viewer, including directing light from a further image source via focusing optics in a further conjugate optical path in which the further image source and the other eye of the viewer are in conjugate relationship to view an image from the further image source when light is reflected in the further conjugate optical path.

37. The method of claim 34, said directing comprising presenting such image for viewing by one eye of a viewer and presenting an image to the other eye of the viewer to provide stereoscopic view, including directing light from a further image source via focusing optics in a further conjugate optical path in which the further image source and the other eye of the viewer are in conjugate relationship to view an image from the further image source when light is reflected in the further conjugate optical path.

38. The method of claim 34, said positioning comprising mounting the focusing optics and beamsplitter with respect to the head of the viewer.

39. The method of claim 38, said positioning comprising mounting the focusing optics and beamsplitter on the head of the viewer as a head mounted display.

40. The method of claim 34, said positioning comprising mounting the focusing optics, beamsplitter and image source with respect to a housing having a viewing outlet at which a viewer may view an image.

41. A method for viewing an image, comprising directing light from a liquid crystal display image source mountable with respect to the head of a viewer via focusing optics and a beamsplitter to form a real image for viewing by one eye of a viewer, the focusing optics and beamsplitter being positioned in relation to each other and said directing light comprising directing light along a conjugate light path, using a retro-reflector that is remotely located relative to the beamsplitter and focusing optics, reflecting light along the conjugate light path via the beamsplitter to said eye of a viewer, said directing light via focusing optics comprising directing light via focusing optics which has a focal length about the same or smaller than the focal length of said eye of the viewer, and positioning the focusing optics and beamsplitter relative to the viewer such that the pupil of said eye stands in the same relation to the beamsplitter as the focusing optics stands in relation to the beamsplitter to view an image from the image source when light is reflected in the conjugate light path.

42. An optical display, comprising an optical system and a liquid crystal display image source, and means for forming a conjugate optical path, including a retro-reflector that is remotely located relative to the liquid crystal display image source, leading to one eye of an observer to provide an image on the retina of said eye that is the same or smaller in size as the size of the image at the image source such that the size of the area of the image from the image source is bounded by the size of the retina.

* * * * *